(12) United States Patent
Taguchi

(10) Patent No.: US 11,981,469 B2
(45) Date of Patent: May 14, 2024

(54) INSPECTION DEVICE, PTP PACKAGING MACHINE AND INSPECTION METHOD

(71) Applicant: CKD CORPORATION, Aichi (JP)

(72) Inventor: Yukihiro Taguchi, Aichi (JP)

(73) Assignee: CKD CORPORATION, Aichi (JP)

( * ) Notice: Subject to any disclaimer, the term of this patent is extended or adjusted under 35 U.S.C. 154(b) by 947 days.

(21) Appl. No.: 16/990,316

(22) Filed: Aug. 11, 2020

(65) Prior Publication Data

US 2020/0369422 A1 Nov. 26, 2020

Related U.S. Application Data

(63) Continuation of application No. PCT/JP2018/039420, filed on Oct. 24, 2018.

(30) Foreign Application Priority Data

Mar. 14, 2018 (JP) .................................. 2018-046501

(51) Int. Cl.
*B65B 57/02* (2006.01)
*B65B 9/04* (2006.01)
(Continued)

(52) U.S. Cl.
CPC .............. *B65B 57/02* (2013.01); *B65B 9/045* (2013.01); *B65B 57/10* (2013.01); *G01N 21/27* (2013.01);
(Continued)

(58) Field of Classification Search
CPC ......... B65B 9/045; B65B 57/02; B65B 57/10; G01N 21/27; G01N 21/35; G01N 21/3563;
(Continued)

(56) References Cited

U.S. PATENT DOCUMENTS 4,707,138 A * 11/1987 Coatney ........... G01N 2021/845
356/402
5,021,645 A * 6/1991 Satula et al. ....... G01N 21/9508
209/580
(Continued)

FOREIGN PATENT DOCUMENTS

JP 2006317271 A * 11/2006
JP 2010-172672 A 8/2010
(Continued)

OTHER PUBLICATIONS

International Search Report issued in corresponding International Application No. PCT/JP2018/039420 dated Jan. 22, 2019 (5 pages).
(Continued)

*Primary Examiner* — Stephen F. Gerrity
(74) *Attorney, Agent, or Firm* — Osha Bergman Watanabe & Burton LLP

(57) ABSTRACT

An inspection device performs an inspection in manufacture of a Press Through Package (PTP) sheet, and includes: an illumination device; a spectroscope that disperses reflected light from the PTP sheet; an imaging device that takes an image of an optical spectrum of the disperses light and acquires spectroscopic image data; and a controller. Before the inspection is performed, the controller grasps disturbance data that is one of either spectral data of a predetermined content placed in the pocket portion and attributed to ambient light, or approximate spectral data approximate to the spectral data of the predetermined content attributed to the ambient light, and corrects either spectral data of the content as an inspection object obtained based on the spectroscopic image data acquired by the imaging device, or a reference value used for determining the spectral data of the content as the inspection object.

13 Claims, 16 Drawing Sheets

(51) Int. Cl.
   *B65B 57/10* (2006.01)
   *G01N 21/27* (2006.01)
   *G01N 21/35* (2014.01)
   *G01N 21/84* (2006.01)
   *G01N 21/88* (2006.01)
   *G01N 21/892* (2006.01)
   *G01N 21/95* (2006.01)

(52) U.S. Cl.
   CPC ............ *G01N 21/35* (2013.01); *G01N 21/892* (2013.01); *G01N 21/9508* (2013.01); *G01N 2021/845* (2013.01); *G01N 2021/8887* (2013.01)

(58) Field of Classification Search
   CPC ............... G01N 21/359; G01N 21/892; G01N 21/9508; G01N 2021/845; G01N 2021/8887
   USPC .................................. 53/453, 559, 246, 507
   See application file for complete search history.

(56) References Cited

U.S. PATENT DOCUMENTS

2002/0125436 A1* 9/2002 Muller et al. ........... B65B 57/10
250/341.1
2016/0290981 A1* 10/2016 Brinker et al. .... G01N 21/9508

FOREIGN PATENT DOCUMENTS

| JP | 2011180070 A | * | 9/2011 | ........... G01N 21/956 |
| JP | 2011226947 A | * | 11/2011 | |
| JP | 6235684 B1 | * | 11/2017 | ............. B65B 57/02 |

OTHER PUBLICATIONS

International Preliminary Report on Patentability issued in corresponding International Application No. PCT/JP2018/039420, dated Sep. 15, 2020, with translation (11 pages).

* cited by examiner

FIG. 16

|  | BAND NUMBER 1 (i=1) | BAND NUMBER 2 (i=2) | BAND NUMBER 3 (i=3) | AVERAGE Vave(j) |
|---|---|---|---|---|
| MEASUREMENT NUMBER 1 (j=1) | V(1, 1)=100 | V(2, 1)=300 | V(3, 1)=200 | Vave(1)=200 |
| MEASUREMENT NUMBER 2 (j=2) | V(1, 2)=200 | V(2, 2)=400 | V(3, 2)=300 | Vave(2)=300 |
| MEASUREMENT NUMBER 3 (j=3) | V(1, 3)=100 | V(2, 3)=300 | V(3, 3)=200 | Vave(3)=200 |
| MEASUREMENT NUMBER 4 (j=4) | V(1, 4)=300 | V(2, 4)=500 | V(3, 4)=400 | Vave(4)=400 |
| MEASUREMENT NUMBER 5 (j=5) | V(1, 5)=200 | V(2, 5)=400 | V(3, 5)=300 | Vave(5)=300 |
| <MEASUREMENT REFERENCE TABLE> AVERAGE SPECTRAL INTENSITY B(i) | B(1)=180 | B(2)=380 | B(3)=280 | Bave=280 |

FIG. 17

|  | BAND NUMBER 1 (i=1) | BAND NUMBER 2 (i=2) | BAND NUMBER 3 (i=3) | AVERAGE Vave(j) |
|---|---|---|---|---|
|  |  |  |  |  |
| MEASUREMENT NUMBER 2 (j=2) | V(1, 2)=200 | V(2, 2)=400 | V(3, 2)=300 | Vave(2)=300 |
|  |  |  |  |  |
| MEASUREMENT NUMBER 4 (j=4) | V(1, 4)=300 | V(2, 4)=500 | V(3, 4)=400 | Vave(4)=400 |
| MEASUREMENT NUMBER 5 (j=5) | V(1, 5)=200 | V(2, 5)=400 | V(3, 5)=300 | Vave(5)=300 |
| <MEASUREMENT REFERENCE TABLE> AVERAGE SPECTRAL INTENSITY B(i) | B(1)=180 | B(2)=380 | B(3)=280 | Bave=280 |

FIG. 18

|  | BAND NUMBER 1 (i=1) | BAND NUMBER 2 (i=2) | BAND NUMBER 3 (i=3) | AVERAGE Vave(j) |
|---|---|---|---|---|
|  |  |  |  |  |
| MEASUREMENT NUMBER 2 (j=2) | V'(1, 2)=20 | V'(2, 2)=20 | V'(3, 2)=20 | V'ave(2)=20 |
|  |  |  |  |  |
| MEASUREMENT NUMBER 4 (j=4) | V'(1, 4)=120 | V'(2, 4)=120 | V'(3, 4)=120 | V'ave(4)=120 |
| MEASUREMENT NUMBER 5 (j=5) | V'(1, 5)=20 | V'(2, 5)=20 | V'(3, 5)=20 | V'ave(5)=20 |
| <DISTURBANCE DATA> AVERAGE DIFFERENCE D(i) | D(1)=53 | D(2)=53 | D(3)=53 | Dave=53 |

FIG. 19

|  | BAND NUMBER 1 (i=1) | BAND NUMBER 2 (i=2) | BAND NUMBER 3 (i=3) | AVERAGE |
|---|---|---|---|---|
| <DISTURBANCE DATA> NORMALIZED DIFFERENCE VALUE DS(i) | DS(1)=1 | DS(2)=1 | DS(3)=1 | DSave=1 |

| POCKET NUMBER | BAND NUMBER 1 (i=1) | BAND NUMBER 2 (i=2) | BAND NUMBER 3 (i=3) | AVERAGE |
|---|---|---|---|---|
| 1 | DS(1)=1 | DS(2)=1 | DS(3)=1 | DSave=1 |
| 2 | DS(1)=1 | DS(2)=1 | DS(3)=1 | DSave=1 |
| 3 | DS(1)=1 | DS(2)=1 | DS(3)=1 | DSave=1 |
| 4 | DS(1)=1 | DS(2)=1 | DS(3)=1 | DSave=1 |
| 5 | DS(1)=1 | DS(2)=1 | DS(3)=1 | DSave=1 |
| 6 | DS(1)=1 | DS(2)=1 | DS(3)=1 | DSave=1 |
| 7 | DS(1)=1 | DS(2)=1 | DS(3)=1 | DSave=1 |
| 8 | DS(1)=1 | DS(2)=1 | DS(3)=1 | DSave=1 |
| 9 | DS(1)=1 | DS(2)=1 | DS(3)=1 | DSave=1 |
| 10 | DS(1)=1 | DS(2)=1 | DS(3)=1 | DSave=1 |
| <DISTURBANCE REFERENCE TABLE> DISTURBANCE REFERENCE DATA C(i) | C(1)=1 | C(2)=1 | C(3)=1 | Cave=1 |

# INSPECTION DEVICE, PTP PACKAGING MACHINE AND INSPECTION METHOD

BACKGROUND

Technical Field

The present invention relates to an inspection device configured to perform inspection for inclusion of any different type of object and the like by taking advantage of spectral analysis, a PTP packaging machine equipped with the inspection device, and an inspection method.

Description of Related Art

A PTP (press through pack) sheet is known as a blister pack sheet generally used in the field of pharmaceutical products and the like.

A PTP sheet is comprised of a container film that has pocket portions filled with contents, such as tablets, and a cover film that is mounted to the container film such as to seal openings of the pocket portions. The cover film is made from, for example, a transparent resin material, whereas the cover film is made from, for example, aluminum foil.

In manufacture of the PTP sheet, for example, different type inclusion inspection that is inspection for inclusion of any different type of object is performed. A method that takes advantage of spectral analysis is generally known as a technique for such inspection (as described in, for example, Patent Literature 1).

Patent Literature 1 discloses a method of inspection performed after the content is placed in the pocket portion and the cover film is mounted to the container film. This method irradiates the content with near-infrared light across the pocket portion (container film), disperses reflected light from the irradiation by a spectrometer, and performs an analysis process (principal component analysis) based on image data obtained by imaging the dispersed reflected light, so as to inspect the content.

PATENT LITERATURE

Patent Literature 1: JP 2010-172672A

As shown in FIG. 21, however, irradiation light L0 which a content 83 placed in a pocket portion 82 of a PTP sheet 80 (container film 81) is irradiated with includes not only primary irradiation light L1 that is emitted from a light source and passes through the pocket portion 82 to directly irradiate the content 83, but ambient light L2 that is reflected by a cover film 84 or the like as a disturbance factor and is subsequently reflected by an inner surface of the pocket portion 82 to irradiate a surface of the content 83 and ambient light L3 that irradiates the surface of the content 83 through the pocket portion 82 (container film 81) serving as a light guiding plate.

The primary irradiation light L1 that directly irradiates the content 83 without reflection from the disturbance factor such as the cover film 84 has a different light quantity and a different wavelength characteristic from those of the ambient lights L2 and L3 that are once reflected from the disturbance factor such as the cover film 84 and then irradiate the content 83.

For example, the primary irradiation light L1 that directly irradiates the content 83 has a little variation in light quantity to be stable and has a wavelength characteristic of a relatively uniform spectral intensity in respective wavelength bands with regard to respective PTP sheets 80 and with respective pocket portions 82 (as shown in FIG. 22A).

The ambient lights L2 and L3, on the other hand, have significant variations in light quantity and wavelength characteristic in the respective PTP sheets 80 and in the respective pocket portions 82, due to reflection amounts from the disturbance factor such as the cover film 84 and errors in shape and thickness of the respective pocket portions 82 (as shown in FIG. 22B). Accordingly, the irradiation light L0 as the composite light of the primary irradiation light L1 and the ambient lights L2 and L3 also has variations in light quantity and wavelength characteristic in the respective PTP sheets 80 and in the respective pocket portions 82 (as shown in FIG. 22C).

In the case where the contents 83 are irradiated with the irradiation light L0 having variations in the respective PTP sheets 80 and in the respective pocket portions 82, even the identical contents 83 have a variation in result of spectral analysis (spectral data) obtained by imaging the respective contents 83.

As a result, there is a difficulty in determination of the contents 83 in the state that the contents 83 are placed in the pocket portions 82 of the PTP sheet 80 (container film 81). This is likely to reduce the inspection accuracy.

Even in the configuration of moving the content by means of the gravity to a position where the content is in contact with part of the pocket portion and irradiating the content with near-infrared light via the pocket portion from a contact surface side where the content is in contact with part of the pocket portion as described in Patent Literature 1, the light passing through inside of the pocket portion (container film) as if passing through inside of the light guiding plate like the ambient light L3 described above is likely to irradiate the contact surface of the content that is in contact with the pocket portion and to cause a phenomenon similar to that described above.

SUMMARY

One or more embodiments of the present invention provide an inspection device configured to, for example, suppress reduction in inspection accuracy in an inspection that takes advantage of spectral analysis, as well as a PTP packaging machine and an inspection method.

Functions and advantageous effects that are characteristic of one or more embodiments are also described as appropriate.

An inspection device of one or more embodiments comprises an irradiation unit (i.e., illumination device) configured to irradiate a predetermined object with near-infrared light; a spectral unit (i.e., spectroscope) configured to disperse reflected light that is reflected from the object irradiated with the near-infrared light; an imaging unit (i.e., imaging device) configured to take an image of an optical spectrum of the reflected light dispersed by the spectral unit; a spectral data obtaining module (i.e., controller) configured to obtain spectral data with regard to the object, based on spectroscopic image data obtained by the imaging unit; and an analysis module (i.e., controller) configured to perform a predetermined analysis process (for example, principal component analysis), based on the spectral data. The inspection device is configured to perform a predetermined inspection (for example, different type inclusion inspection) that takes advantage of spectral analysis in manufacture of a PTP sheet such that a predetermined content (for example, a tablet) is placed in a pocket portion formed in a container film and that a cover film is mounted to the container film so as to close the pocket portion. The inspection device further comprises a disturbance data grasping module (i.e., controller) configured to grasp spectral data with regard to the content attributed to (or affected by) ambient light, which is generated by irradiation of a predetermined disturbance factor (for example, a cover film or the like) by the irradiation unit, or approximate spectral data that is approximate to the spectral data attributed to the ambient light, as disturbance data, in at least a pre-stage before the inspection is performed; and a correction module (i.e., controller) configured to correct spectral data obtained by imaging an inspection object content placed in the pocket portion or to correct a reference value used for determination of the spectral data, based on the disturbance data, in a process of performing the inspection.

The configuration of one or more embodiments allows for good/poor quality judgment of the spectral data obtained by imaging the inspection object content with substantially eliminating influence of ambient light in the process of performing different type inclusion inspection or the like that takes advantage of spectral analysis.

As a result, this configuration allows for stable spectral analysis of the content even in the state that the content is placed in the pocket portion of the container film. This accordingly suppresses reduction in inspection accuracy.

In the inspection device of one or more embodiments, the disturbance data grasping module may be configured to perform: a process of obtaining spectral data with regard to a plurality of non-defective contents that are imaged in a state that the plurality of non-defective contents are placed in the pocket portions; a process of specifying first spectral data that has no influence or that has little influence of the ambient light, based on the spectral data with regard to the plurality of non-defective contents; a process of specifying second spectral data that has influence or that has significant influence of the ambient light, based on the spectral data with regard to the plurality of non-defective contents; and a process of specifying the disturbance data from a difference between the first spectral data and the second spectral data.

The configuration of one or more embodiments specifies the disturbance data, based on the spectral data obtained by actually imaging the contents placed in the pocket portions. This configuration accordingly suppresses redundant information beyond necessity, for example, spectral data attributed to ambient light which the content is actually not irradiated with, from being included in disturbance data and thereby enhances the inspection accuracy.

Out of the spectral data with regard to the plurality of non-defective contents, data having a relatively large spectral intensity may be estimated as the second spectral data including a large portion of the spectral data attributed to the ambient light.

Accordingly, for example, an average value of the spectral data with regard to the plurality of non-defective contents may be specified as the first spectral data described above, whereas data exceeding the average value may be specified as the second spectral data described above. This enables a difference between these first and second spectral data to be specified as the disturbance data described above.

In the inspection device of one or more embodiments, the correction module may be configured to perform: a process of multiplying the disturbance data by a predetermined coefficient; a process of subtracting a resulting value of the multiplying from the spectral data obtained by imaging the inspection object content; a process of specifying the coefficient that minimizes a difference between a resulting value of the subtracting and the first spectral data, as a correction coefficient; and a process of correcting the spectral data obtained by imaging the inspection object content, based on the correction coefficient and the disturbance data.

The configuration of one or more embodiments specifies the correction coefficient that is suitable for the spectral data obtained by imaging the inspection object content and performs the correction. This enhances the inspection accuracy.

In the inspection device of one or more embodiments, the irradiation unit may be arranged at such a position that allows the content to be irradiated across the pocket portion with the near-infrared light, and the imaging unit may be arranged to take the image of the optical spectrum of the reflected light from the content across the pocket portion.

Under the configuration of one or more embodiments, the issue described above is more likely to arise. The functions and the advantageous effects described above or the like are thus more effective in the configuration of one or more embodiments.

One or more embodiments provide a PTP packaging machine configured to manufacture a PTP sheet such that a predetermined content is placed in a pocket portion formed in a container film and that a cover film is mounted to the container film so as to close the pocket portion. The PTP packaging machine comprises a pocket portion forming unit (i.e., pocket portion former) configured to form the pocket portion in the container film that is conveyed in a belt-like manner; a filling unit (i.e., filler) configured to fill the content into the pocket portion; a mounting unit (i.e., mounter) configured to mount the cover film in a belt-like shape to the container film with the pocket portion filled with the content, so as to close the pocket portions; a separation unit (i.e., separator) (including a punching unit configured to punch out the belt-like body in the unit of a sheet) configured to separate the PTP sheet from a belt-like body (PTP film in a belt-like shape) obtained by mounting the cover film to the container film; and the inspection device described above.

Like the configuration of one or more embodiments, the PTP packing machine provided with the above inspection device or the like has an advantage of, for example, excluding a defective product including a different type of object with high accuracy in the process of manufacturing the PTP sheet. The PTP packaging machine may be configured to include a discharge unit that discharges the PTP sheet determined as defective by the inspection device.

The PTP packaging machine of one or more embodiments may employ a configuration that the inspection device is arranged in "a post process after the pocket portion is filled with the content by the filling unit and a previous process before the cover film is mounted by the mounting unit". This configuration enables inspection of the content to be performed without any shielding substance and thereby enhances the inspection accuracy of the individual contents.

In one or more embodiments, for example, when the container film is made from a light shielding material (for example, a metal material such as aluminum or an opaque resin material), the light reflected by the inner surface of the pocket portion is likely to become ambient light and exert influence on the inspection.

When the container film is made from a transparent resin material or the like, on the other hand, light reflected from a disturbance factor, for example, a conveyance mechanism, located in the background is likely to become ambient light and exert influence on the inspection.

The PTP packaging machine of one or more embodiments may employ a configuration that the inspection device is arranged in "a post process after the cover film is mounted by the mounting unit and a previous process before the PTP sheet is separated by the separation unit". This configuration enables inspection to be performed in a state that contents are not exchanged, and thereby enhances the inspection accuracy. In this configuration, imaging and inspection of the content may be performed from a side where the content is not in contact with the pocket portion.

The PTP packaging machine of one or more embodiments may employ a configuration that the inspection device is arranged in "a post process after the PTP sheet is separated by the separation unit". This configuration enables a check for inclusion of any defective product to be performed in a final stage.

One or more embodiments provide an inspection method of performing a predetermined inspection (for example, different type inclusion inspection) that takes advantage of spectral analysis by using an inspection device in manufacture of a PTP sheet such that a predetermined content (for example, a tablet) is placed in a pocket portion formed in a container film and that a cover film is mounted to the container film so as to close the pocket portion. The inspection device comprises an irradiation unit configured to irradiate a predetermined object with near-infrared light; a spectral unit configured to disperse reflected light that is reflected from the object irradiated with the near-infrared light; an imaging unit configured to take an image of an optical spectrum of the reflected light dispersed by the spectral unit; a spectral data obtaining module configured to obtain spectral data with regard to the object, based on spectroscopic image data obtained by the imaging unit; and an analysis module configured to perform a predetermined analysis process (for example, principal component analysis), based on the spectral data. The inspection method comprises a disturbance data grasping process of grasping spectral data with regard to the content attributed to ambient light, which is generated by irradiation of a predetermined disturbance factor (for example, a cover film or the like) by the irradiation unit, or approximate spectral data that is approximate to the spectral data attributed to the ambient light, as disturbance data, in at least a pre-stage before the inspection is performed; and a correction process of correcting spectral data obtained by imaging an inspection object content placed in the pocket portion or correcting a reference value used for determination of the spectral data, based on the disturbance data, in a process of performing the inspection.

The configuration of one or more embodiments has similar functions and advantageous effects described above.

BRIEF DESCRIPTION OF DRAWINGS

FIG. 9 is a diagram illustrating a relationship between a conveying direction imaging range and a tablet and the like;

FIG. 16 is a table illustrating spectral intensities and the like in part of wavelength bands with regard to part of measurement data;

FIG. 17 is a table illustrating spectral intensities and the like in part of wavelength bands with regard to extracted part of measurement data;

FIG. 18 is a table illustrating differences between spectral intensities and average spectral intensities and the like in part of wavelength bands with regard to extracted part of measurement data;

FIG. 19 is a table illustrating part of a disturbance table;

FIG. 20 is a table illustrating part of a disturbance table with regard to respective pocket portions and part of averaged disturbance reference data;

FIG. 21 is a diagram illustrating irradiation light which a content placed in a pocket portion is irradiated with;

DETAILED DESCRIPTION OF EMBODIMENTS

The following describes embodiments with reference to drawings. The configuration of a PTP sheet is described first in detail.

Figure 1A:
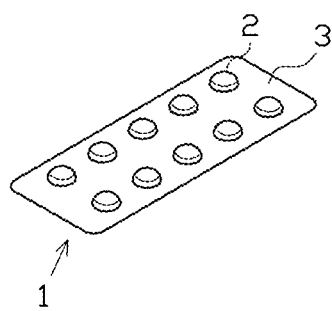
FIG. 1A is a perspective view illustrating a PTP sheet and FIG. 1B is a perspective view illustrating a PTP film.
Figure 1B:
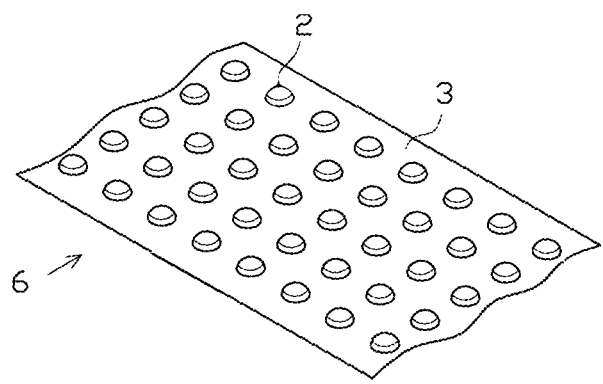
Figure 2:
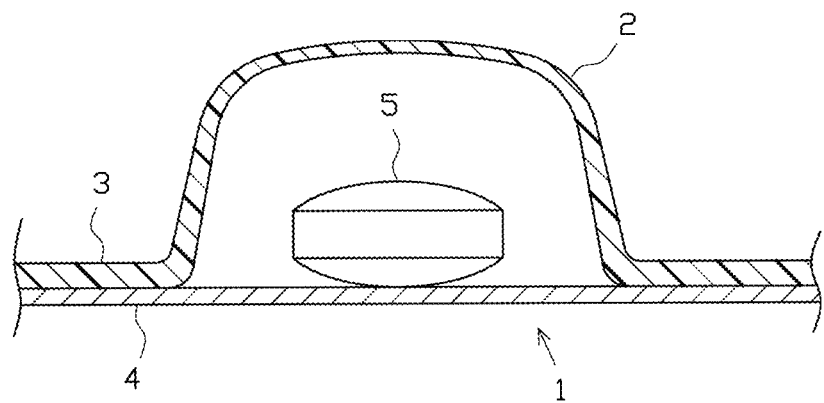
FIG. 2 is a partly enlarged sectional view illustrating a pocket portion of the PTP sheet.

As shown in FIG. 1 and FIG. 2, a PTP sheet 1 includes a container film 3 provided with a plurality of pocket portions 2, and a cover film 4 mounted to the container film 3 such as to close the respective pocket portions 2.

The container film 3 according to one or more embodiments is made from a transparent or translucent thermoplastic resin material, such as PP (polypropylene) or PVC (polyvinyl chloride), and has translucency. The cover film 4 is, on the other hand, made from an opaque material (for example, aluminum foil) with a sealant made of, for example, a polypropylene resin, provided on the surface thereof.

The PTP sheet 1 is formed in an approximately rectangular shape in plan view. The PTP sheet 1 is configured such that two pocket arrays are formed along a sheet short side direction and that each pocket array includes five pocket portions 2 arranged along a sheet longitudinal direction. Accordingly, the PTP sheet1 has a total of ten pocket portions 2. One tablet 5 is placed as a content in each of the pocket portions 2.

The PTP sheet 1 (shown in FIG. 1A) is manufactured by punching sheets from a belt-like PTP film 6 (shown in FIG. 1B) that is comprised of the belt-like container film 3 and the belt-like cover film 4.

The following describes the general configuration of a PTP packaging machine 10 used to manufacture the PTP sheet 1 described above, with reference to FIG. 3.

Figure 3:
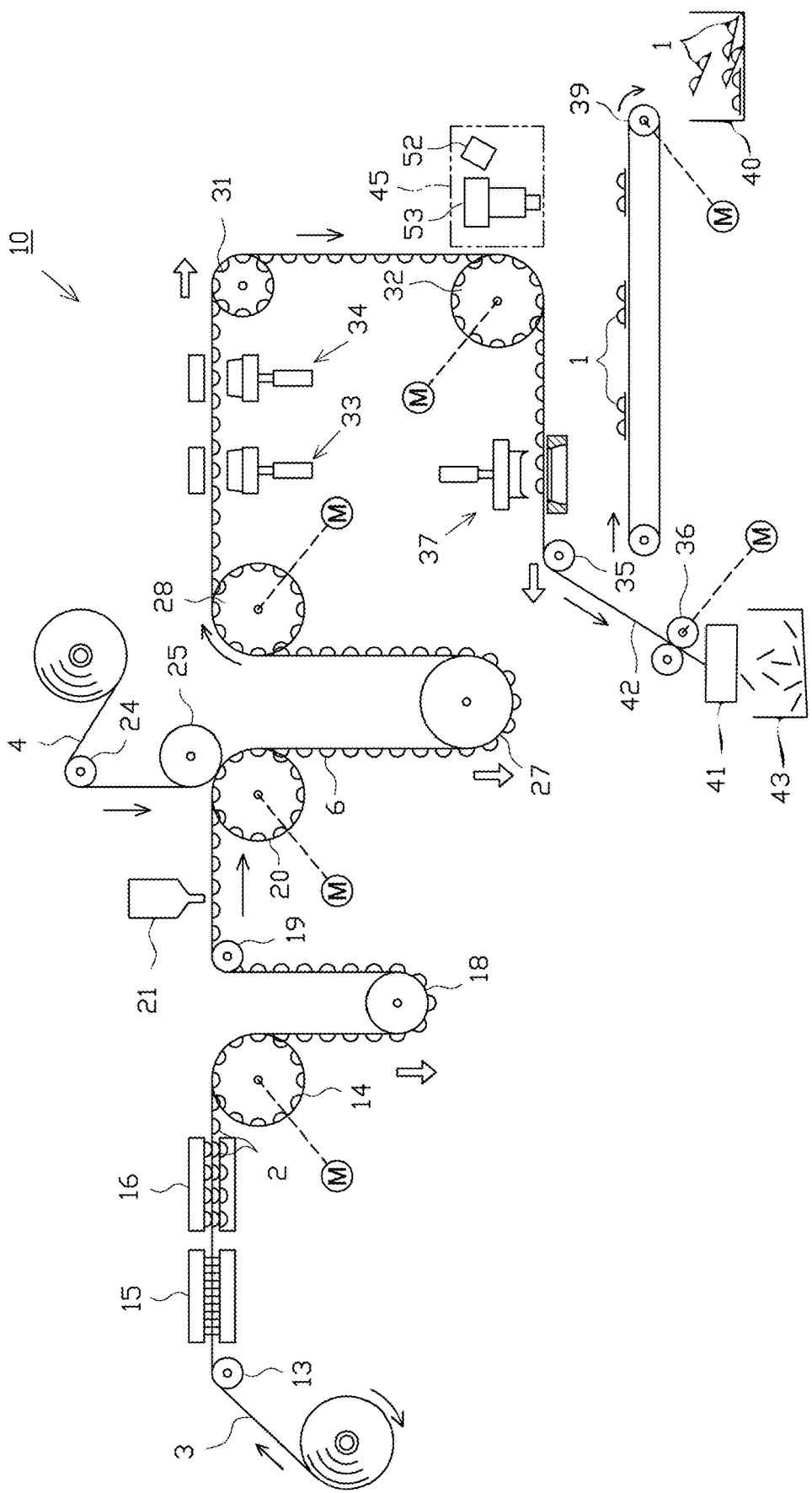
FIG. 3 is a diagram illustrating the schematic configuration of a PTP packaging machine.

As shown in FIG. 3, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is linked with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 are configured as the pocket portion forming unit (i.e., pocket portion former) according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is linked with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is placed along the conveyance path of the container film 3 between the guide roll 19 and the film receiving roll 20. The tablet filling device 21 serves as the filling unit (i.e., filler) to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation (filling process).

A film roll of the belt-like cover film 4 is also wound in a roll form on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations provides the belt-like PTP film 6 manufactured such that the tablet 5 is filled in each of the pocket portions 2. The heating roll 25 has minute protrusions formed on the surface of the heating roll 25 in a net-like pattern for sealing. Strongly pressing these protrusions against the films provides secure sealing. The film receiving roll 20 and the heating roll 25 are configured as the mounting unit (i.e., mounter) according to one or more embodiments.

The PTP film 6 fed from the film receiving roll 20 is sequentially laid on a tension roll 27 and an intermittent feed roll 28 in this order. The intermittent feed roll 28 is linked with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is linked with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (i.e., separation unit or separator) to punch out the outer periphery of each portion of the PTP film 6 in the unit of PTP sheet 1.

The respective PTP sheets 1 punched out by the sheet punching device 37 are conveyed by a conveyor 39 and are temporarily accumulated in a finished product hopper 40 (separation process). The PTP sheet 1 with the pocket portions 2 face up is placed on and conveyed by the conveyor 39 in such a state that a longitudinal direction of the PTP sheet 1 is along a conveyor width direction (X direction) and a short side direction of the PTP sheet 1 is along a sheet conveying direction (Y direction).

An inspection device 45 is placed at a position above the conveyor 39. The inspection device 45 is a spectroscopic analyzer configured to perform an inspection that takes advantage of spectral analysis and more specifically to check for inclusion of any different type of object.

When a PTP sheet 1 is determined as a defective product by the inspection device 45, however, this PTP sheet 1 determined as defective is not conveyed to the finished product hopper 40 but is separately discharged by a non-illustrated defective sheet discharge mechanism serving as the discharge unit.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 20, 28, 31 and 32 described above is arranged such that the roll surface is opposed to the pocket portions 2. The surface of each roll, for example, the surface of the intermittent feed roll 14, has recesses that are formed to place the pocket portions 2 therein. This configuration suppresses the pocket portions 2 from being crushed. The feeding operation with the pocket portions 2 placed in the recesses of each roll, for example, the intermittent feed roll 14, achieves the reliable intermittent feed and continuous feed.

Figure 4:
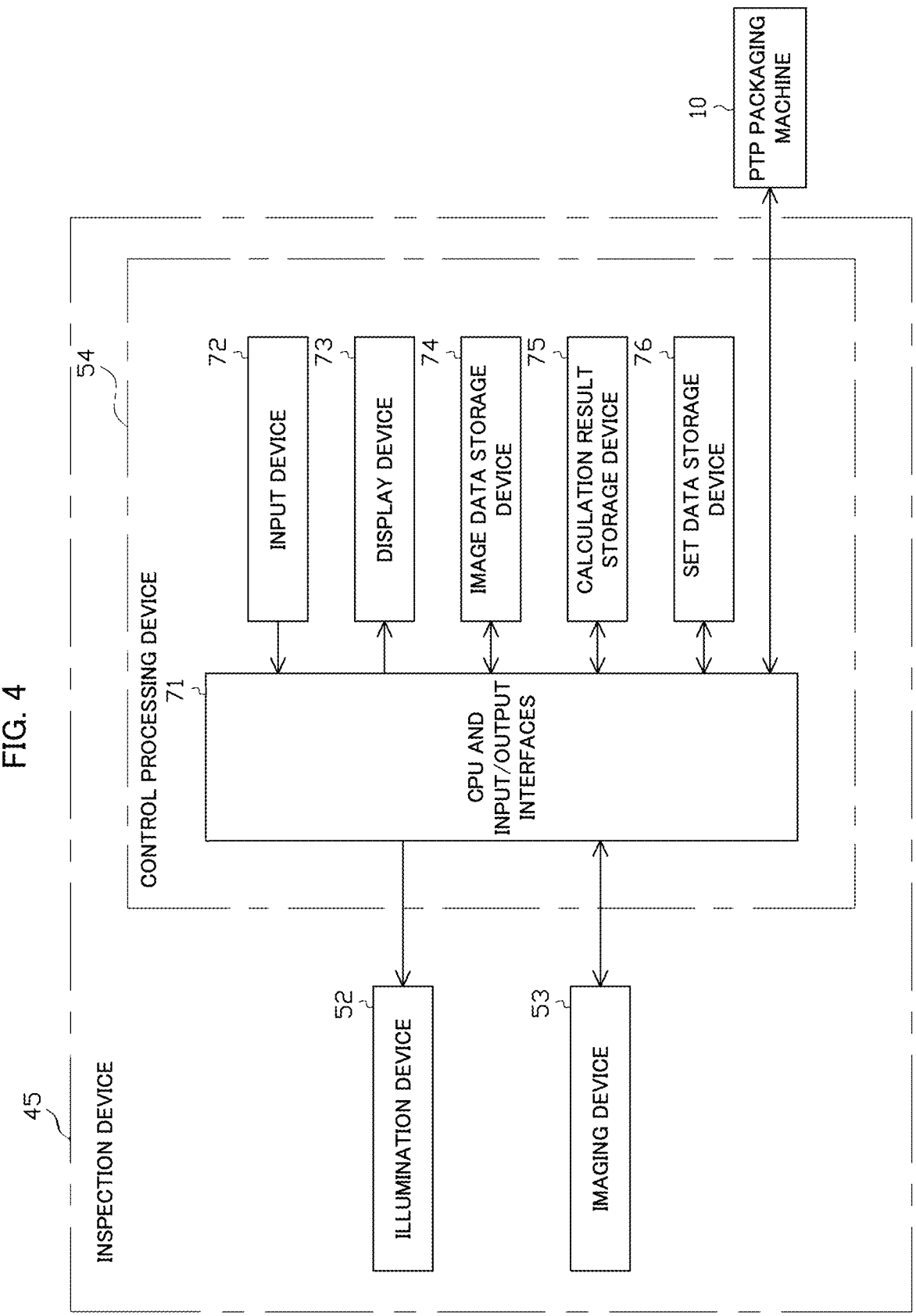
FIG. 4 is a block diagram illustrating the electrical configuration of an inspection device.
Figure 5:
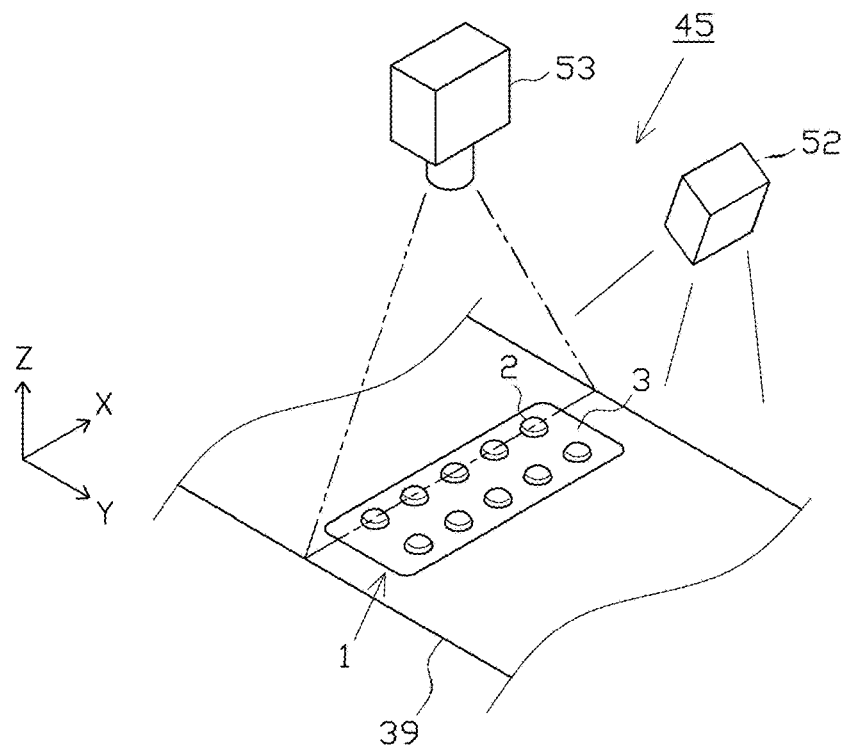
FIG. 5 is a perspective view schematically illustrating the arrangement configuration of the inspection device.

The foregoing describes the outline of the PTP packaging machine 10. The following describes the configuration of the above inspection device 45 in detail with reference to drawings. FIG. 4 is a block diagram illustrating the electrical configuration of the inspection device 45. FIG. 5 is a perspective view schematically illustrating the arrangement configuration of the inspection device 45.

As shown in FIG. 4 and FIG. 5, the inspection device 45 includes an illumination device 52, an imaging device 53, and a control processing device 54 (i.e., controller) configured to perform various controls in the inspection device 45, for example, drive controls of the illumination device 52 and the imaging device 53, image processing, arithmetic operations and the like.

The illumination device 52 has a known configuration to radiate near-infrared light and is configured as the irradiation unit according to one or more embodiments. The illumination device 52 is arranged to irradiate a predetermined area on the conveyor 39 obliquely downward with near-infrared light.

According to one or more embodiments, a halogen lamp is employed for the illumination device 52 as a light source configured to emit near-infrared light having a continuous spectrum (for example, a near infrared range having a wavelength of 700 to 2500 nm). Other examples usable as the light source include a deuterium lamp, a tungsten lamp, and a xenon lamp.

As shown in FIG. 5, the imaging device 53 is placed vertically above the conveyor 39 and is configured to take an image of the PTP sheet 1 on the conveyor 39.

Figure 6:
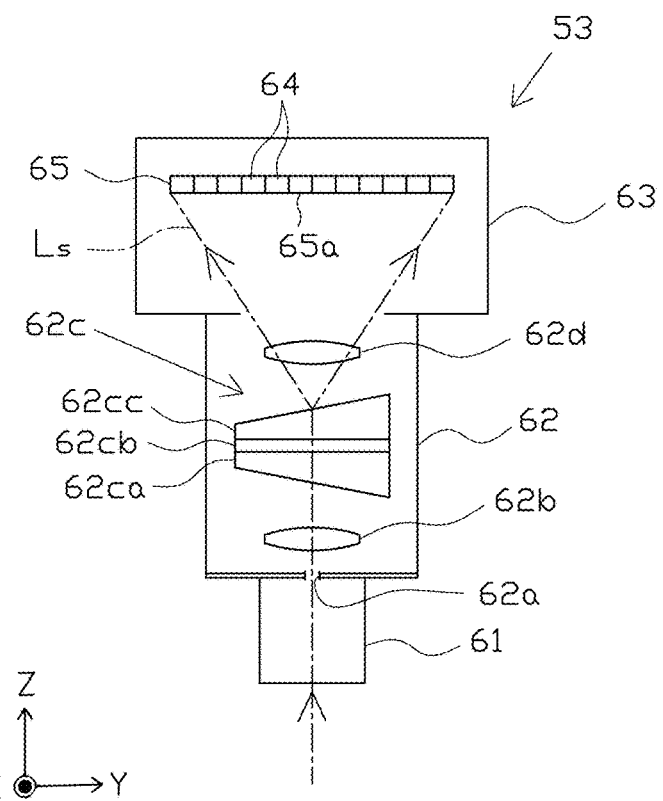
FIG. 6 is a diagram illustrating the schematic configuration of an imaging device.

As shown in FIG. 6, the imaging device 53 includes an optical lens assembly 61, a two-dimensional spectroscope 62 serving as the spectral unit, and a camera 63 serving as an imaging unit (i.e., imaging device).

The optical lens assembly 61 is comprised of a plurality of non-illustrated lenses and the like and is configured to convert incident light into parallel light. The optical lens assembly 61 has an optical axis that is set along a vertical direction (Z direction).

The optical lens assembly 61 is set to focus the incident light at the position of a slit 62*a* of the two-dimensional spectroscope 62 described later. As a matter of convenience, the following describes an example of employing a double-sided telecentric lens for the optical lens assembly 61. An image-sided telecentric lens may, however, also be employable for the optical lens assembly 61.

The two-dimensional spectroscope 62 is configured to include a slit 62*a*, an incident-side lens 62*b*, a spectral portion 62*c* and an emission-side lens 62*d*. The spectral portion 62*c* is configured to include an incident-side prism 62*ca*, a transmission type diffraction grating 62*cb*, and an emission-side prism 62*cc*.

Under the configuration described above, the light passing through the slit 62*a* is converted into parallel light by the incident-side lens 62*b*, is dispersed by the spectral portion 62*c*, and is focused by the emission-side lens 62*d* on an imaging element 65 of the camera 63 described later as a two-dimensional spectroscopic image (optical spectral image).

The slit 62*a* is formed to have a long approximately rectangular (linear) opening and is provided such that an opening width direction (short side direction) thereof is arranged along the sheet conveying direction (Y direction) and that a longitudinal direction thereof is arranged along the conveyor width direction (X direction) orthogonal to the sheet conveying direction. This configuration causes the two-dimensional spectroscope 62 to disperse the incident light in the opening width direction of the slit 62*a*, i.e., in the sheet conveying direction (Y direction). Accordingly, the sheet conveying direction (Y direction) denotes the wavelength dispersion direction according to one or more embodiments.

The camera 63 includes an imaging element 65 having a light receiving surface 65*a* where a plurality of light-receiving elements (light receivers) 64 are two-dimensionally arranged in a matrix arrangement. According to one or more embodiments, a known CCD area sensor having sufficient sensitivity to, for example, a wavelength range of 1300 to 2000 nm, out of the near infrared range, is employed as the imaging element 65.

A generally known configuration of the CCD area sensor includes a plurality of light-receiving elements that are two-dimensionally arranged in a matrix arrangement and that are formed from photoelectric transducers (for example, photo diodes) configured to convert the incident light into electric charges corresponding to its quantity of light and to accumulate the converted electric charges therein; a plurality of vertical transfer portions that are configured to successively transfer the electric charges accumulated in the respective light-receiving elements in a vertical direction; a horizontal transfer portion that are configured to successively transfer the electric charges transferred from the vertical transfer portions in a horizontal direction; and an output amplifier that is configured to convert the electric charges transferred from the horizontal transfer portion into a voltage, to amplify the voltage and to output the amplified voltage.

The imaging element is, however, not necessarily limited to this example, but another sensor having sensitivity to the near infrared range is also employable as the imaging element. For example, a CMOS sensor or an MCT (HgCdTe) sensor may be employed as the imaging element.

The imaging device 53 has a field of vision (imaging area) that is a linear region extended along the conveyor width direction (X direction) and that is a region including the entire width direction of the conveyor 39 (as shown by a two-dot chain line portion in FIG. 5). The field of vision of the imaging device 53 in the sheet conveying direction (Y direction) is, on the other hand, a region corresponding to the opening width of the slit 62*a*. In other words, the field of vision is a region that causes an image of the light passing through the slit 62*a* (slit light) to be formed on the light receiving surface 65*a* of the imaging element 65.

This configuration causes each wavelength band (for example, every bandwidth of 10 to 20 nm) of the optical spectrum of the reflected light that is reflected at each position in the conveyor width direction (X direction) to be received by each of the light-receiving elements 64 of the imaging element 65. A signal corresponding to the intensity of the light received by each of the light-receiving elements 64 is converted into a digital signal and is then output from the camera 63 to the control processing device 54. Accordingly, an image signal (spectroscopic image data) corresponding to one image plane that is imaged by the entire light receiving surface 65a of the imaging element 65 is output to the control processing device 54.

The control processing device 54 includes a CPU and input/output interfaces 71 (hereinafter referred to as "CPU and the like 71") that is configured to control the entire inspection device 45, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data obtained by the imaging device 53, spectral image data obtained on the basis of the spectroscopic image data, and binarized image data after a binarization process.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, loading vectors and a determination range used for principal component analysis, the shapes and the dimensions of the PTP sheet 1, the pocket portion 2 and the tablet 5, and a disturbance reference table generated in advance prior to a start of inspection as described later.

The following describes a procedure of different type inclusion inspection (inspection process) performed by the inspection device 45.

Figure 7:
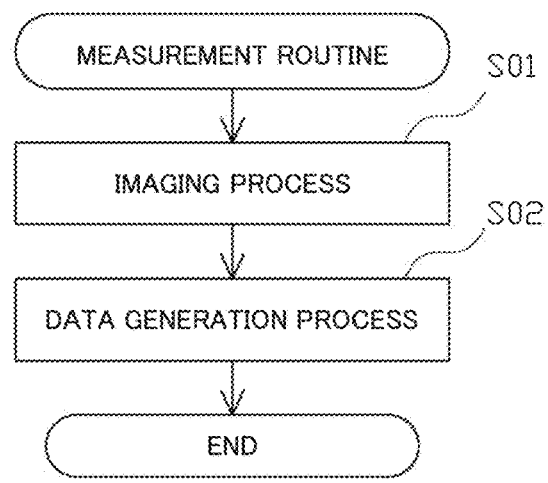
FIG. 7 is a flowchart showing a measurement routine.

A measurement routine performed by the inspection device 45 to obtain spectral data with regard to the PTP sheet 1 is described first with reference to the flowchart of FIG. 7. This routine is a process performed repeatedly every time a predetermined amount of the PTP sheet 1 is conveyed by the conveyor 39.

At step S01, the control processing device 54 first causes the imaging device 53 to perform an imaging process (exposure process), while irradiating the PTP sheet 1 continuously conveyed by the conveyor 39 with near-infrared light emitted from the illumination device 52 (irradiation process).

The control processing device 54 drives and controls the imaging device 53 in response to a signal input from a non-illustrated encoder provided in the conveyor 39, and stores spectroscopic image data taken by the imaging device 53 into the image data storage device 74.

Accordingly, reflected light that is reflected in a conveying direction imaging range W (shown in FIG. 9), out of the near-infrared light emitted from the illumination device 52 toward the PTP sheet 1, during an execution period of the imaging process of step S01 (exposure period) enters the imaging device 53. In other words, an image of the conveying direction imaging range W is taken by one imaging process.

The reflected light entering the imaging device 53 is dispersed by the two-dimensional spectroscope 62 (dispersion process) and is taken in the form of a spectroscopic image (optical spectrum) by the imaging element 65 of the camera 63 (imaging process). During the execution period of the imaging process (exposure period), the PTP sheet 1 is continuously conveyed, so that this process takes an image of an averaged optical spectrum in the conveying direction imaging range W (as shown in FIG. 8).

Figure 8:
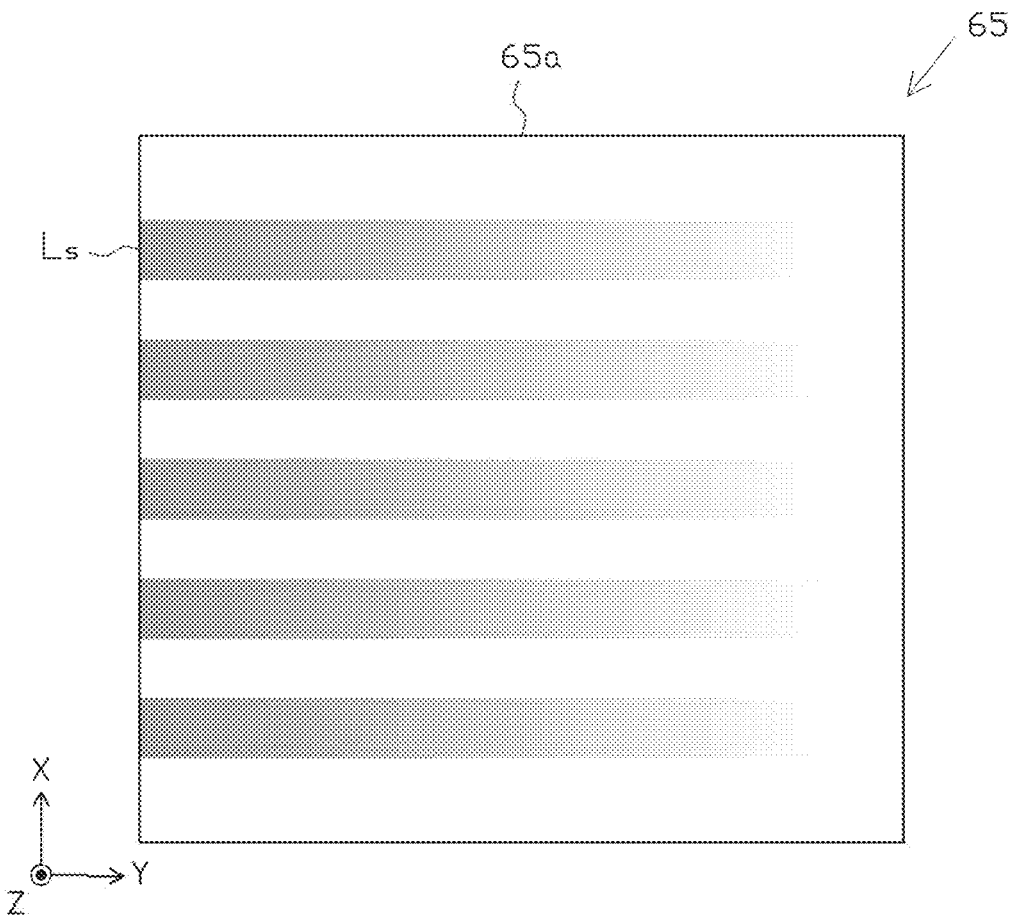
FIG. 8 is a diagram illustrating an optical spectrum projected onto an imaging element.

FIG. 8 is a diagram illustrating the state that an optical spectrum $L_s$ of reflected light that is reflected at a predetermined position on the tablet 5 is projected onto the light receiving surface 65a of the imaging element 65. As a matter of convenience, FIG. 8 illustrates only the optical spectrum $L_s$ with regard to the tablet 5, while omitting optical spectra with regard to the other locations, such as the cover film 4.

The spectroscopic image (optical spectrum) data taken by the imaging device 53 is output to the control processing device 54 during an interval period and is stored into the image data storage device 74. The interval period herein denotes a reading period of image data. Accordingly, an imaging cycle of the imaging device 53 is expressed by a total time of the exposure period that is the execution period of the imaging process and the interval period.

After obtaining the spectroscopic image data, the control processing device 54 starts a data generation process at step S02.

The data generation process generates spectral data, based on the spectroscopic image data obtained at step S01. After generating the spectral data, the control processing device 54 stores the generated spectral data into the image data storage device 74 and then terminates this routine. This process corresponds to the spectral data obtaining process according to one or more embodiments. The processing function of the control processing device 54 that performs this process configures the spectral data obtaining module according to one or more embodiments.

Figure 9:
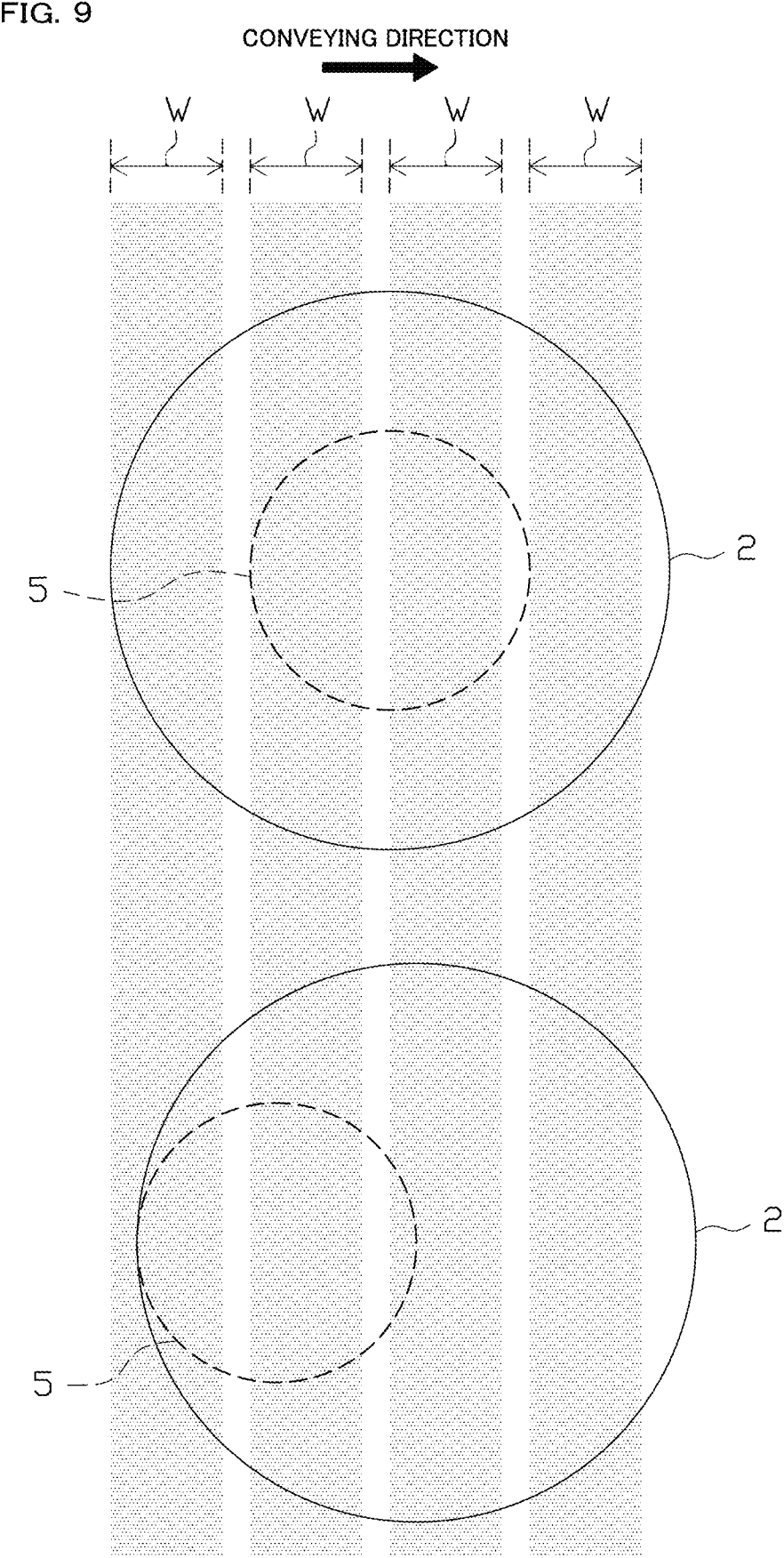
Figure 10:
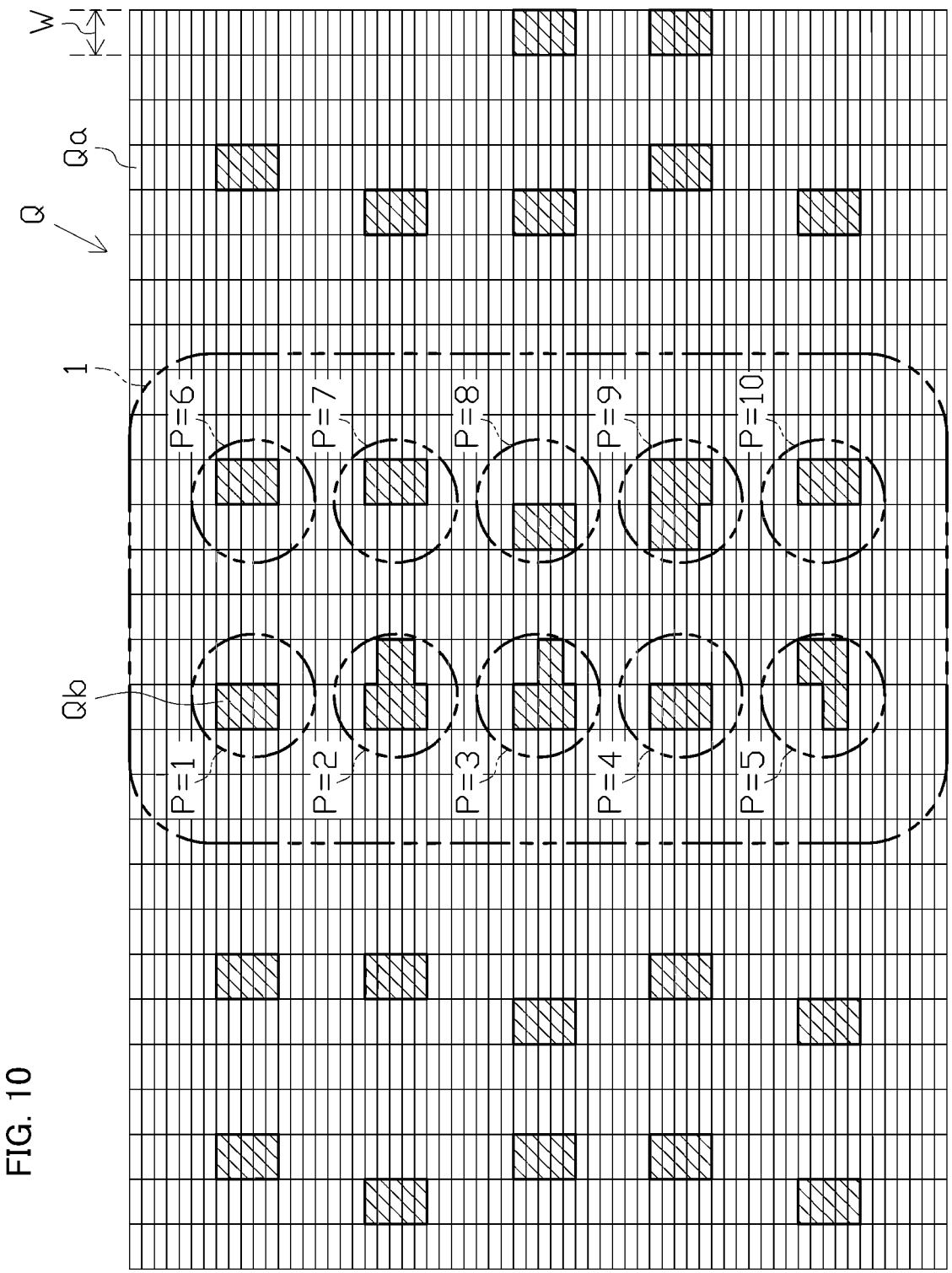
FIG. 10 is a diagram illustrating a spectral image.

As shown in FIG. 9, every time a predetermined amount of the PTP sheet 1 is conveyed, the conveying direction imaging range W is relatively moved intermittently and the measurement routine described above is performed repeatedly. This causes spectral data corresponding to the respective conveying direction imaging ranges W to be successively stored in time series into the image data storage device 74 along with position information in the sheet conveying direction (Y direction) and in the conveyor width direction (X direction). This series of operations generate a two-dimensional spectral image Q having spectral data with regard to each pixel (as shown in FIG. 10).

The following describes the spectral image Q according to one or more embodiments. As shown in FIG. 10, the spectral image Q is image data including a plurality of pixels Qa arrayed in a two-dimensional arrangement. The respective pixels Qa include spectral data (data indicating spectral intensities (luminance values) in a predetermined number n (for example, n=100 bands) of wavelength bands).

When obtaining the spectral image Q in a range corresponding to one PTP sheet 1 (as shown by a two-dot chain line portion in FIG. 10), the control processing device 54 performs an analysis object specification routine.

Figure 11:
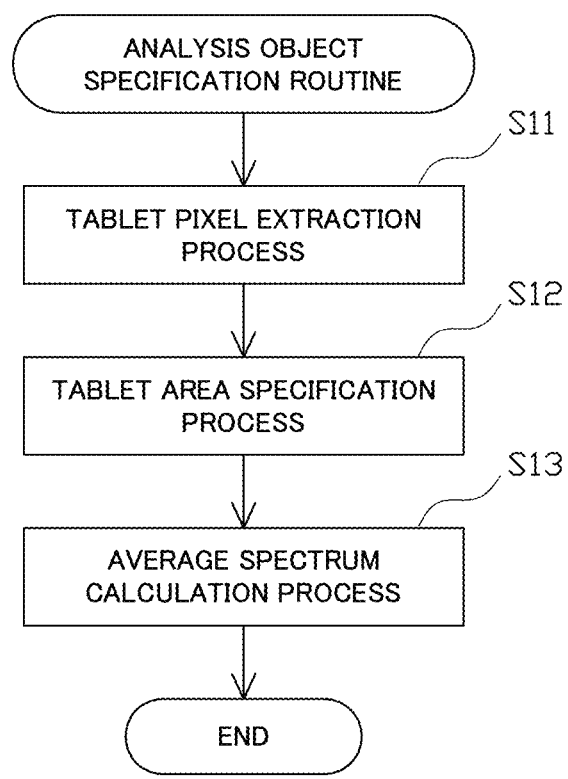
FIG. 11 is a flowchart showing an analysis object specification routine.

The following describes the analysis object specification routine with reference to the flowchart of FIG. 11. This routine is performed repeatedly every time the spectral image Q in the range corresponding to one PTP sheet 1 is obtained.

The control processing device 54 first performs a tablet pixel extraction process at step S11. In this process, the control processing device 54 extracts pixels Qb corresponding to the tablet 5 as an object to be analyzed (hereinafter referred to as "tablet pixels" Qb), among the respective pixels Qa of the spectral image Q.

According to one or more embodiments, for example, the control processing device 54 determines whether the spectral intensities (luminance values) at a predetermined wavelength in the spectral data of the respective pixels Qa are equal to or greater than a predetermined reference value and processes the spectral image Q by a binarization process. The control processing device 54 then extracts the tablet pixels Qb, based on the obtained binarized image data (as shown in FIG. 10 and FIG. 12).

Figure 12:
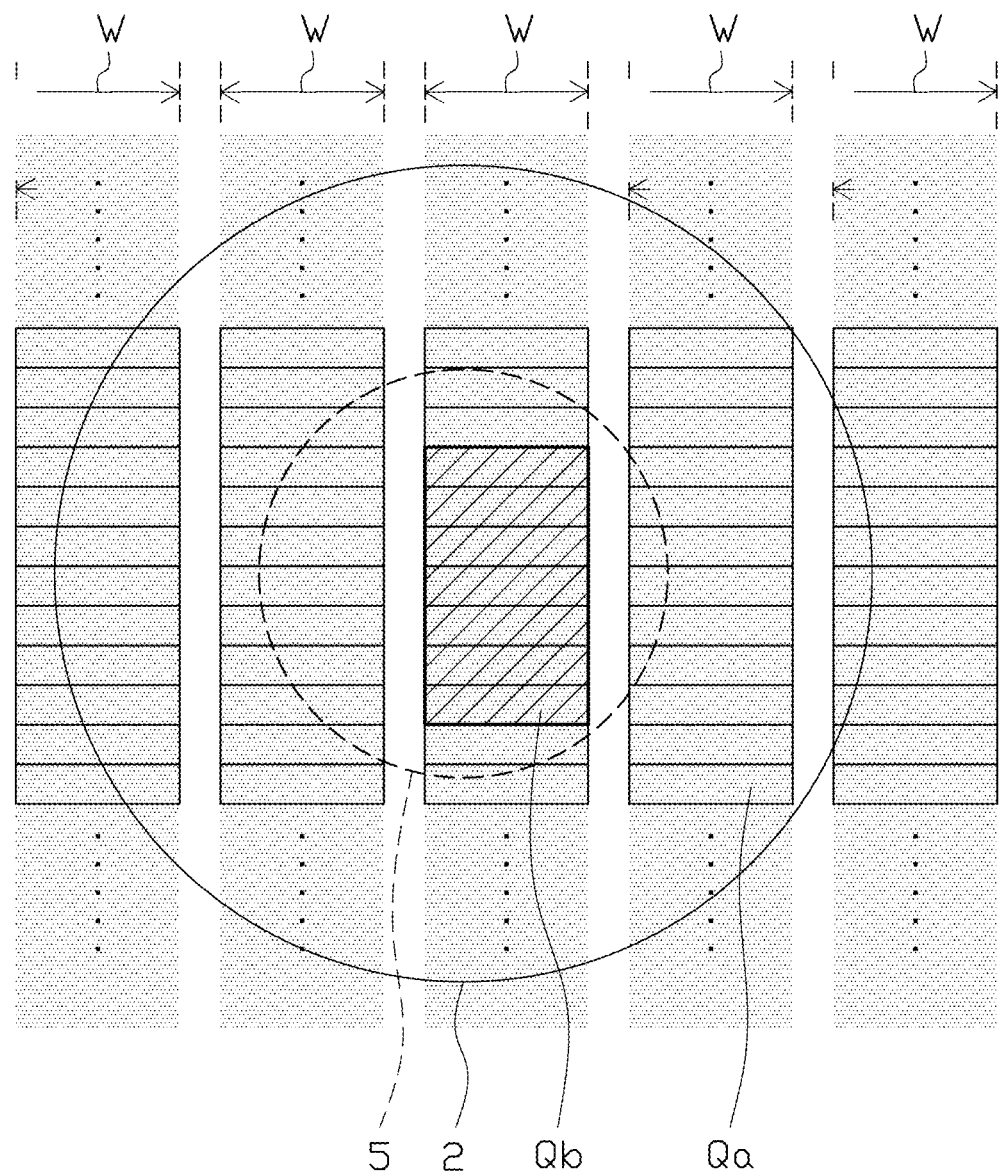
FIG. 12 is a diagram illustrating a relationship between the conveying direction imaging range and the spectral image.

According to one or more embodiments, as shown in FIG. 12, pixels Qa that do not include data of imaging a background part such as the cover film 4, i.e., pixels Qa that include data of imaging only the range of the tablet 5, are extracted as tablet pixels Qb. FIG. 12 is a diagram illustrating a relationship between the conveying direction imaging range W and the spectral image Q. Pixels extracted as the tablet pixels Qb are given as hatched areas in FIGS. 10 and 12.

The extraction procedure of the tablet pixels Qb is, however, not limited to this method, but another method may be employed. For example, another employable method may calculate an integrated value of spectral data (spectral intensities in the respective wavelength bands) with regard to each of the pixels Qa and determine whether the calculated integrated value is equal to or greater than a predetermined reference value, so as to extract the tablet pixels Qb.

The control processing device 54 subsequently performs a tablet area specification process at step S12. In this process, the control processing device 54 specifies areas of ten tablets 5 placed in the respective pocket portions 2 of the PTP sheet 1.

According to one or more embodiments, for example, the control processing device 54 performs a labeling process with regard to the tablet pixels Qb obtained at step S11 described above and regards all adjacent tablet pixels Qb as linkage components of the tablet pixels Qb belonging to one identical tablet 5.

This process specifies one range of linkage components as a tablet area with regard to one tablet 5 placed in a predetermined pocket portion 2 (as shown in FIG. 10 and FIG. 12). In FIG. 10 and FIG. 12, linkage components (tablet area) of a plurality of tablet pixels Qb belonging to each tablet 5 are encircled by a thick frame.

The area specification procedure of the tablet 5 is, however, not limited to this method, but another method may be employed. For example, another employable method may determine pixels included in a predetermined range about a specific pixel at center, as pixels belonging to one identical tablet 5 with the specific pixel.

The control processing device 54 subsequently performs an average spectrum calculation process at step S13. In this process, with regard to each of the tablet areas of the respective tablets 5 specified at step S12 described above, the control processing device 54 calculates average spectral data of the tablet 5 by using spectral data of a plurality of tablet pixels Qb included in the tablet area.

According to one or more embodiments, the control processing device 54 averages all spectral data of a plurality of tablet pixels Qb belonging to the tablet area of one tablet 5 and calculates the averaged spectral data as average spectral data with regard to the tablet 5. This configuration is, however, not essential. A modification may be configured to extract part of a plurality of tablet pixels Qb belonging to the tablet area of one tablet 5 and calculate average spectral data with regard to the tablet 5 by using spectral data of the extracted tablet pixels Qb.

After calculating the average spectral data (hereinafter referred to as "spectral measurement data") with regard to each of the ten tablets 5 placed in the respective pocket portions 2 of one PTP sheet 1 as described above, the control processing device 54 stores these spectral measurement data as measurement data with regard to the PTP sheet 1 into the calculation result storage device 75 and then terminates this routine.

Figure 13:
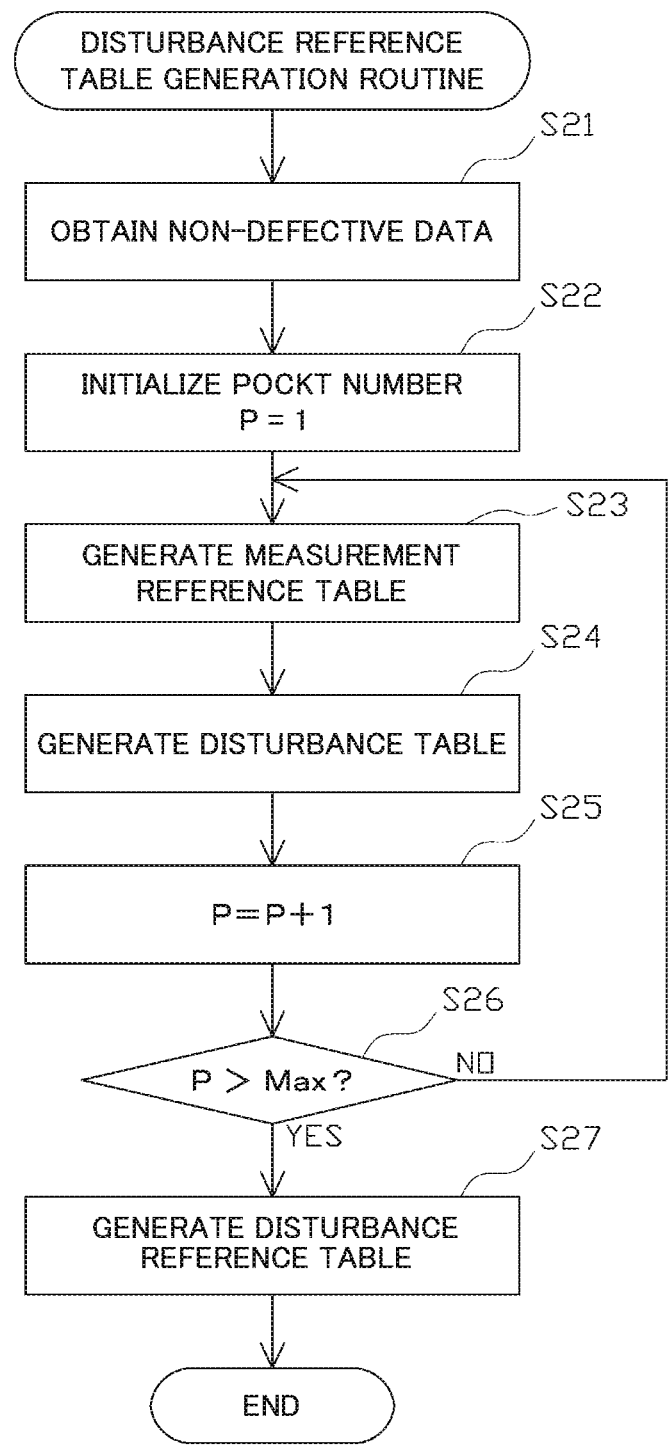
FIG. 13 is a flowchart showing a disturbance reference table generation routine.

The following describes a disturbance reference table generation routine performed prior to a start of manufacturing the PTP sheet 1 (prior to a start of different type inclusion inspection) with reference to the flowchart of FIG. 13.

This routine is a routine performed to set in advance a disturbance reference table that is used to correct the above measurement data (spectral measurement data with regard to each of the ten tablets 5 placed in the respective pocket portions 2 of one PTP sheet 1) obtained in the different type inclusion inspection.

Accordingly, this routine corresponds to the disturbance data grasping process according to one or more embodiments. The function of the control processing device 54 that performs this routine mainly configures the disturbance data grasping module.

The control processing device 54 first performs a non-defective data obtaining process at step S21. In this process, the control processing device 54 performs the measurement routine and the analysis object specification routine described above with regard to a predetermined number m (for example, m=200) of non-defective PTP sheets 1 provided in advance to obtain measurement data with regard to the m non-defective PTP sheets 1 and to store the obtained measurement data into the calculation result storage device 75.

At step S22, the control processing device 54 subsequently sets a value P of a pocket number counter provided in the calculation result storage device 75 to an initial value "1".

The "pocket number" denotes a serial number assigned to each of the ten pocket portions 2 on one PTP sheet 1. The position of each pocket portion 2 is specified by the value P of the pocket number counter described above (hereinafter simply referred to as "pocket number P") (as shown in FIG. 10).

In the illustrated example of FIG. 10, for example, an uppermost pocket portion 2 in a left column is set as the pocket portion 2 corresponding to a pocket number [1]. A lowermost pocket portion 2 in a right column is set as the pocket portion 2 corresponding to a pocket number [10].

The control processing device 54 subsequently performs a measurement reference table generation process at step S23. In this process, the control processing device 54 first extracts spectral measurement data of the tablet 5 as a non-defective content placed in the pocket portion 2 corresponding to the current pocket number P (for example, P=1) from each of the measurement data with regard to the m non-defective PTP sheets 1 obtained at step S21 described above.

The control processing device 54 subsequently calculates an average spectral intensity B(i) that is an average value of spectral intensities V(i,j) in each of wavelength bands (band number i=1 to n), based on the extracted spectral measurement data of the m tablets 5 (measurement number j=1 to m), and calculates an average value Bave that is an average value of the average spectral intensities B(i)) in all the wavelength bands (as shown in FIG. 16).

The measurement number j (1≤j≤m, j represents a natural number) denotes a serial number assigned to each of the measurement data with regard to the predetermined number m (for example, m=200) non-defective PTP sheets 1 obtained at step S21 described above.

The band number i (1≤i≤n, i represents a natural number) denotes a serial number assigned to each of a predetermined number n (for example, n=100 bands) of wavelength bands included in the spectral measurement data.

FIG. 16 illustrates extract of spectral intensities V(i,j) in wavelength bands of band numbers [1] to [3] with regard to measurement data of measurement numbers [1] to [5], as well as average spectral intensities B(i) calculated by using these spectral intensities V(i,j) and an average value Bave of the average spectral intensities B(i).

The control processing device 54 then stores the average spectral intensities B(i) in the respective wavelength bands calculated as described above as a measurement reference table in the calculation result storage device 75, and stores the average value Bave that is the average value of the average spectral intensities B(i) as an average value of the entire measurement reference table in the calculation result storage device 75.

The "measurement reference table (average spectral intensities B in the respective wavelength bands) corresponds to the "first spectral data having little influence of ambient light" according to one or more embodiments.

The control processing device 54 subsequently performs a disturbance table generation process at step S24. In this process, the control processing device 54 first extracts spectral measurement data of the tablet 5 placed in the pocket portion 2 corresponding to the current pocket number P (for example, P=1) from each of the measurement data with regard to the m non-defective PTP sheets 1 obtained at step S21 described above.

The control processing device 54 subsequently calculates an average spectral intensity Vave(j) that is an average value of the spectral intensities V(i,j) in all the wavelength bands (band number i=1 to n) with regard to each of the measurement data, based on the extracted spectral measurement data (measurement number j=1 to m) of the m tablets 5 (as shown in FIG. 16).

The extracted example of FIG. 16 illustrates average spectral intensities Vave(1) to Vave(5) that are average values of the spectral intensities V(i,j) in the wavelength bands of the band numbers [1] to [3] with regard to the respective measurement data of the measurement numbers [1] to [5].

The control processing device 54 subsequently extracts measurement data that satisfies a relational expression of Vave(j)>Bave, i.e., measurement data that has the average spectral intensity Vave(j) greater than the average value Bave of the average spectral intensity B(i).

The measurement data that has the average spectral intensity Vave(j) greater than the average value Bave of the average spectral intensity B(i) corresponds to the "second spectral data having significant influence of ambient light" according to one or more embodiments.

For example, in the extracted example shown in FIG. 16, the average spectral intensities Vave(1) and Vave(3) with regard to the measurement data of the measurement numbers [1] and [3] respectively have a value "200", which is smaller than the average value Bave of "280". Accordingly, in this example, measurement data of the measurement numbers [2], [4] and [5] are extracted as shown in FIG. 17.

The control processing device 54 subsequently calculates a difference V'(i,j) between the spectral intensity V(i,j) and the average spectral intensity B(i) in each of the wavelength bands, based on the extracted measurement data described above, and calculates an average difference D(i) that is an average value of these differences V'(i,j) (as shown in FIG. 18).

This average difference D(i) may be regarded as approximate spectral data that is approximate to spectral data attributed to (or affected by) ambient light generated by irradiation of a predetermined disturbance factor such as the cover film 4 with the light from the illumination device 52.

Accordingly, this average difference D(i) can be regarded as disturbance data D(i) at the position of the pocket portion 2 corresponding to the current pocket number P.

The extracted example of FIG. 18 illustrates, for example, a difference V'(1,2) of "20 (=200−180)" between a spectral intensity V(1,2) with regard to the measurement data of the measurement number [2] and an average spectral intensity B(1) in the wavelength band of the band number [1] shown in FIG. 17.

The extracted example of FIG. 18 also illustrates a difference V'(1,4) of "120 (=300−180)" between a spectral intensity V(1,4) with regard to the measurement data of the measurement number [4] and the average spectral intensity B(1) in the wavelength band of the band number [1] and further illustrates a difference V'(1,5) of "20 (=200−180)" between a spectral intensity V(1,5) with regard to the measurement data of the measurement number [5] and the average spectral intensity B(1) in the wavelength band of the band number [1].

FIG. 18 also illustrates an average difference D(1) of "53" in the wavelength band of the band number [1], which is an average value of these differences.

The control processing device 54 subsequently calculates an average value Dave that is an average value of the average differences D(i) in all the wavelength bands. The control processing device 54 then performs normalization by dividing the average difference D(i) in each wavelength band by the average value Dave (as shown in FIG. 19). The control processing device 54 subsequently stores normalized difference values DS(i) obtained in the respective wavelength bands as a disturbance table with regard to the pocket portion 2 corresponding to the current pocket number P into the calculation result storage device 75.

The control processing device 54 subsequently increments the current pocket number P by one (1) at step S25 and proceeds to step S26 to determine whether the newly set pocket number P exceeds a maximum value Max of the number of pockets per sheet ("10" according to one or more embodiments).

In the case of negative determination, the control processing device 54 goes back to step S23 and performs the series of processing described above. In the case of affirmative determination, on the other hand, the control processing device 54 considers that the disturbance table has been obtained with regard to all the pocket portions 2 and proceeds to step S27.

Figures 20, 21:
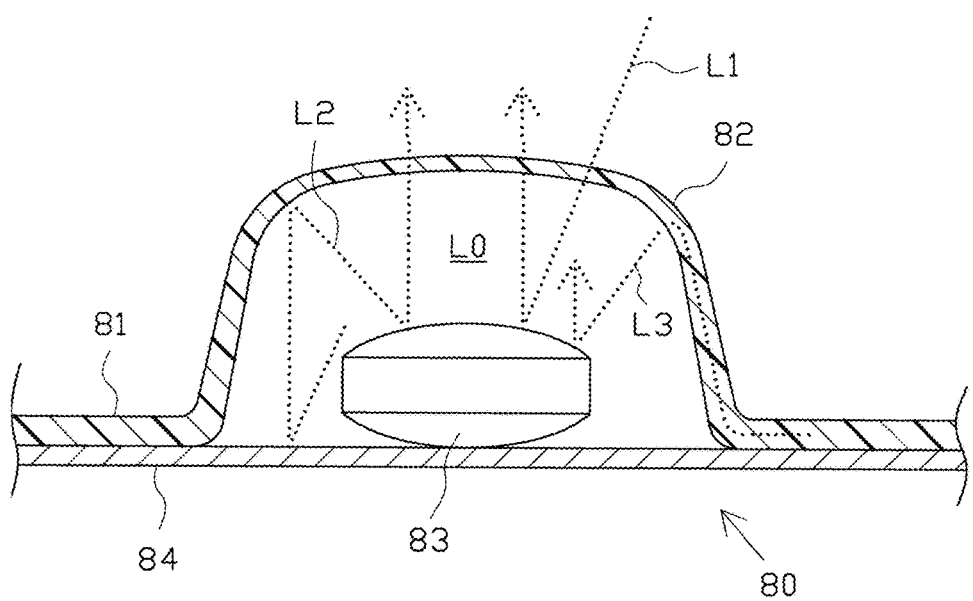
Figure 22A:
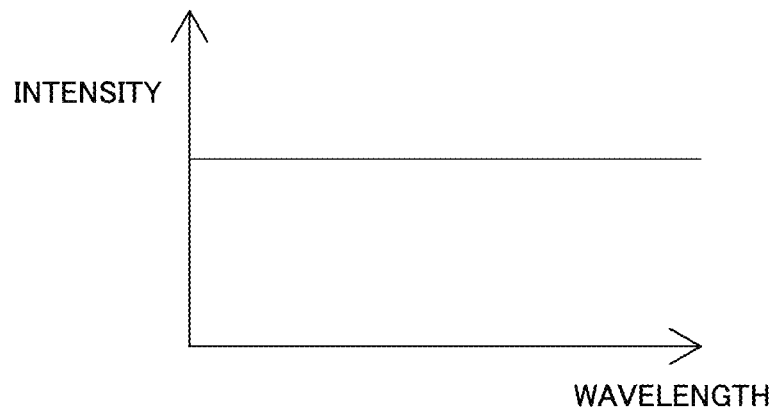
FIG. 22A is a diagram illustrating a wavelength characteristic of principal irradiation light which the content placed in the pocket portion is directly irradiated with, FIG. 22B is a diagram illustrating a wavelength characteristic of ambient light which the content placed in the pocket portion is irradiated with, and FIG. 22C is a diagram illustrating a wavelength characteristic of combined irradiation light of the principal irradiation light and the ambient light.
Figure 22B:
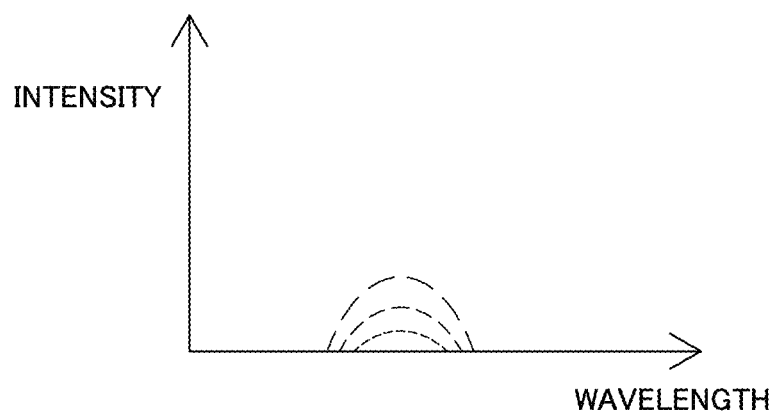
Figure 22C:
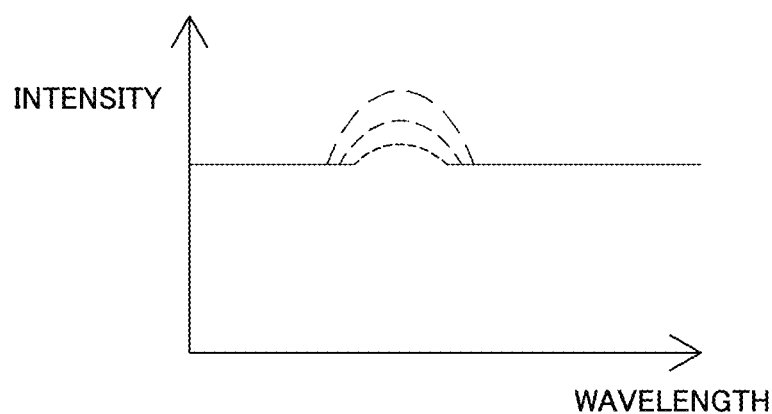

At step S27, the control processing device 54 performs a disturbance reference table generation process. In this process, the control processing device 54 adds up the respective normalized difference values DS(i) in the disturbance table with regard to all the pocket portions 2 of the pocket numbers [1] to [10] and performs an averaging process in each wavelength band (as shown in FIG. 20).

Accordingly, an average value of the normalized difference values DS(i) in each of the wavelength bands of the band numbers [1] to [n] is calculated as disturbance reference data C(i). FIG. 20 illustrates extract of normalized difference values DS(1) to DS(3) in the wavelength bands of the band numbers [1] to [3] and disturbance reference data C(1) to C(3) that are average values of these normalized difference values DS(1) to DS(3).

The control processing device 54 subsequently stores the disturbance reference data C(i) in the respective wavelength bands of the band numbers [1] to [n] as a disturbance reference table in the set data storage device 76 and then terminates this routine.

Figure 14:
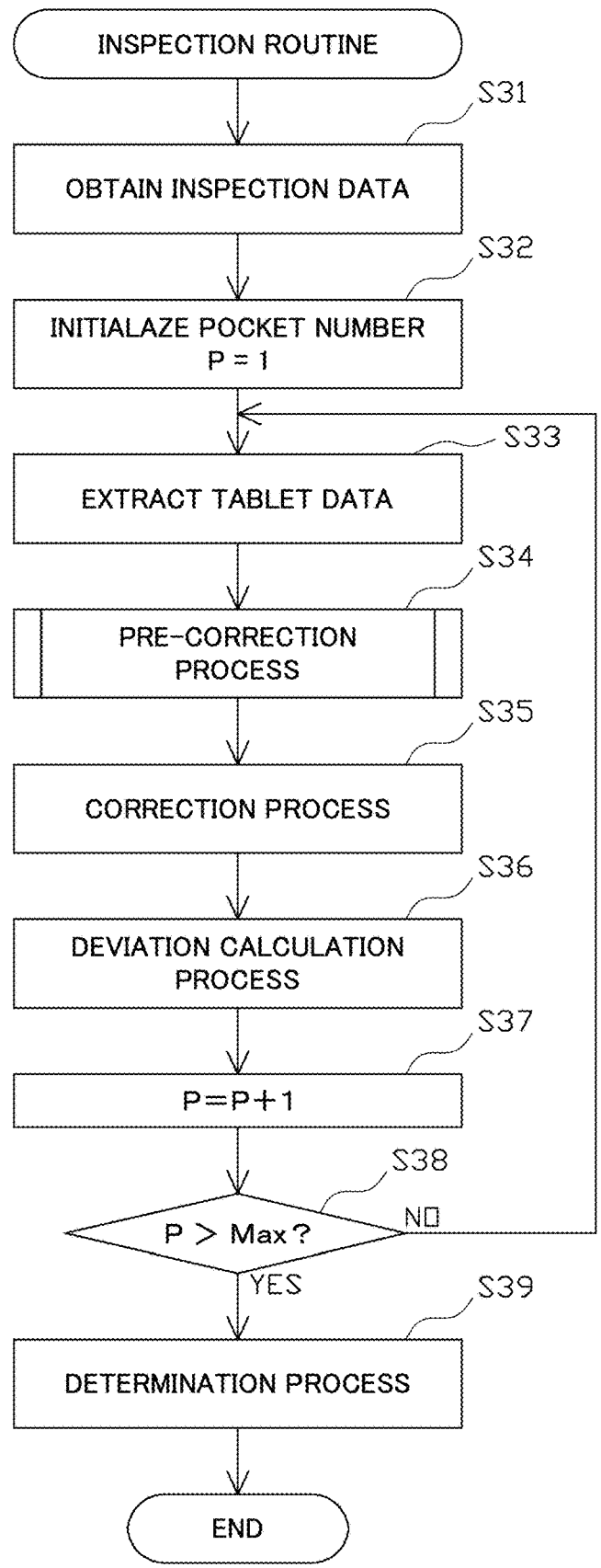
FIG. 14 is a flowchart showing an inspection routine.

The following describes an inspection routine for different type inclusion inspection of the PTP sheet 1 with reference to the flowchart of FIG. 14.

The control processing device 54 first performs an inspection data obtaining process at step S31. In this process, the control processing device 54 performs the measurement routine and the analysis object specification routine described above with regard to the PTP sheet 1 as an inspection object to obtain measurement data with regard to the PTP sheet 1.

The control processing device 54 subsequently sets the pocket number P to an initial value of "1" at step S32.

The control processing device 54 then performs a table data extraction process at step S33. In this process, the control processing device 54 extracts spectral measurement data of the tablet 5 as a content to be inspected or inspection object content placed in the pocket portion 2 corresponding to the current pocket number P (for example, P=1), from the measurement data with regard to the PTP sheet 1 as the inspection object obtained at step S31 described above.

Figure 15:
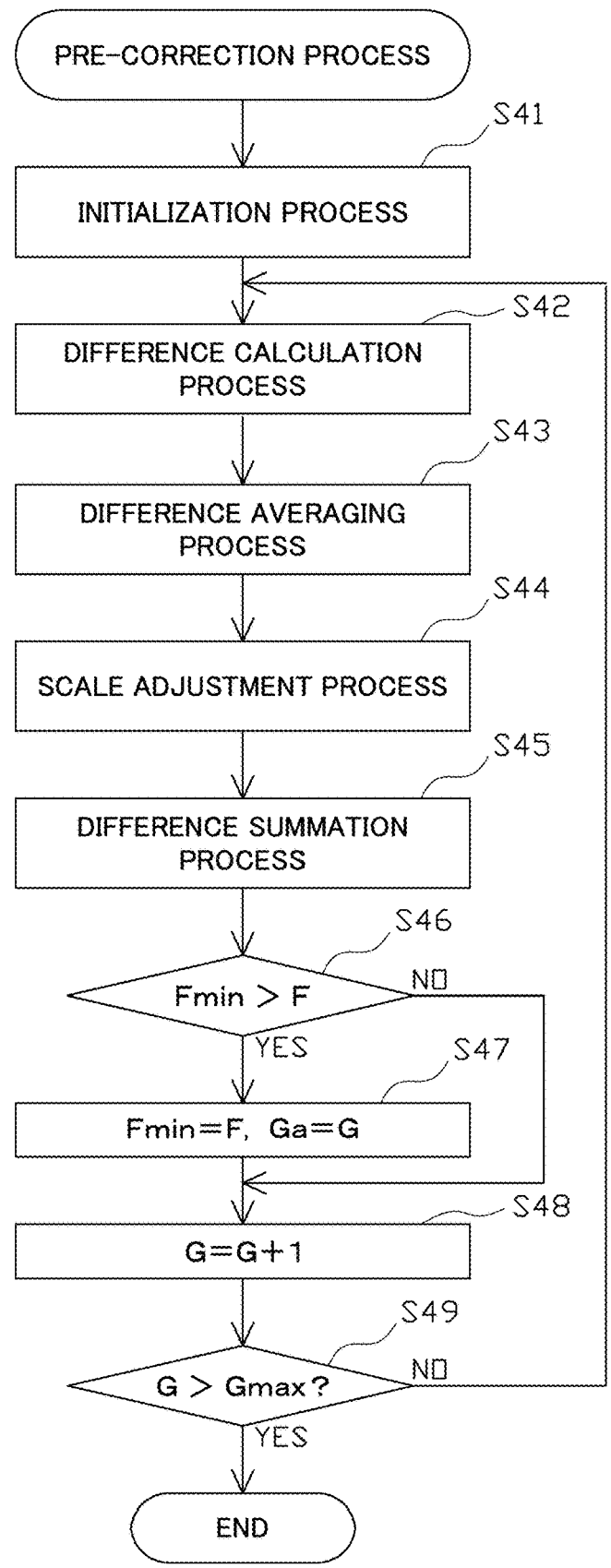
FIG. 15 is a flowchart showing a pre-correction process.

The control processing device 54 subsequently performs a pre-correction process at step S34. The flow of the pre-correction process is described in detail here by referring to the flowchart of FIG. 15.

The control processing device 54 first performs an initialization process at step S41. In this process, the control processing device 54 sets an initial value of a minimum value Fmin of a difference sum F described later and an initial value of a calculation coefficient G in the calculation result storage device 75.

More specifically, the minimum value Fmin of the difference sum F is set to a maximum possible value Fmax of the difference sum F. The calculation coefficient G is set to a minimum possible value Gmin of the calculation coefficient G. The minimum value Gmin is expressed by a relational expression of [Math. 1] given below:

$$G_{min} = -\left\{\frac{\sum_{i=1}^{n}V(i)}{\sum_{i=1}^{n}C(i)}\right\}$$ [Math. 1]

The control processing device 54 subsequently performs a difference calculation process at step S42. In this process, the control processing device 54 subtracts a value that is obtained by multiplying the disturbance reference data C(i) in each of the wavelength bands set in the disturbance reference table by the currently set calculation coefficient G, from the spectral intensity V(i) in each of the wavelength bands (band number i=1 to n) in the spectral measurement data of the tablet 5 obtained at step S33 described above, so as to calculate a difference E(i) in each of the wavelength bands, according to a relational expression shown by [Math. 2] given below:

$$E(i)=V(i)-G\times C$$ [Math. 2]

The control processing device 54 subsequently performs a difference averaging process at step S43. In this process, the control processing device 54 calculates a difference average value Eave that is an average value of the differences E(i) in all the wavelength bands calculated at step S42 described above according to a relational expression shown by [Math. 3] given below:

$$E_{ave} = \frac{\sum_{i=1}^{n}E(i)}{n}$$ [Math. 3]

Here n denotes a band number.

The control processing device 54 subsequently performs a scale adjustment process at step S44. In this process, the control processing device 54 divides the average value Bave of the entire measurement reference table described above by the difference average value Eave calculated at step S43, multiplies the difference E(i) in each of the wavelength bands calculated at step S42 described above by a value obtained by this division, so as to calculate a difference E'(i) after scale adjustment of the difference E(i), according to a relational expression of [Math. 4] given below:

$$E'(i) = E(i) \times \frac{n}{\sum_{i=1}^{n}E(i)} \times B_{ave}$$ [Math. 4]

The control processing device 54 then performs a difference summation process at step S45. In this process, the control processing device 54 divides a difference in each of the wavelength bands between the difference E'(i) after scale adjustment in each of the wavelength bands calculated at step S44 described above and the average spectral intensity B(i) in each of the wavelength bands of the measurement reference table described above by the average spectral intensity B(i), squares a value obtained by this division, and then sums up these square values in all the wavelength bands as the difference sum F, according to a relational expression shown by [Math. 5] given below:

$$F = \sum_{i=1}^{n}\left\{\frac{E'(i)-B(i)}{B(i)}\right\}^{2}$$ [Math. 5]

At step S46, the control processing device 54 subsequently determines whether the value of the difference sum F calculated at step S45 described above is smaller than the currently set minimum value Fmin of the difference sum F. In the case of negative determination, the control processing device 54 proceeds to step S48.

In the case of affirmative determination, on the other hand, the control processing device 54 proceeds to step S47 to perform a process of replacing the minimum value Fmin of the difference sum F currently set in the calculation result storage device 75 with the value of the difference sum F calculated at step S45 (new minimum value Fmin). The control processing device 54 also performs a process of setting the calculation coefficient G currently set in the calculation result storage device 75 as a correction coefficient Ga. The control processing device 54 then proceeds to step S48.

The control processing device 54 increments the calculation coefficient G currently set in the calculation result storage device 75 by "one (1)" at step S48 and then determines whether the value of the newly set calculation coefficient G is larger than a maximum possible value Gmax of the calculation coefficient G at step S49. The maximum value Gmax is expressed by a relational expression of [Math. 6] given below:

$$G_{max} = 2 \times \left\{ \frac{\sum_{i=1}^{n} V(i)}{\sum_{i=1}^{n} C(i)} \right\}$$ [Math. 6]

In the case of negative determination, the control processing device 54 goes back to step S42 to perform the series of processing described above again. In the case of affirmative determination, on the other hand, the control processing device 54 considers settlement of the minimum value Fmin of the difference sum F and the correction coefficient Ga and terminates the pre-correction process.

The description goes back to the inspection routine shown in the flowchart of FIG. 14. The control processing device 54 performs a correction process at step S35.

The correction process of step S35, the pre-correction process of step S34 and the like are configured as the correction process according to one or more embodiments. The function of the control processing device 54 that performs these processes mainly configures the correction module according to one or more embodiments.

In this process, the control processing device 54 corrects the spectral intensity V(i) in each of the wavelength bands (band number i=1 to n) with regard to the spectral measurement data of the tablet 5 obtained at step S33 described above according to a relational expression shown by [Math. 7] given below and stores a corrected spectral intensity V'(i) in each of the wavelength bands as spectral correction data of the tablet 5 in the calculation result storage device 75:

$$V'(i) = \{V(i) - Ga \times C(i)\} \times \frac{n \times B_{ave}}{\sum_{i=1}^{n} \{V(i) - Ga \times C(i)\}}$$ [Math. 7]

The control processing device 54 subsequently performs a deviation calculation process at step S36. In this process, the control processing device 54 calculates a deviation R according to a relational expression shown by [Math. 8] given below and stores the calculated deviation R in the calculation result storage device 75.

$$R = \frac{1}{B_{ave}} \times \sqrt{\frac{F_{min}}{n}}$$ [Math. 8]

The control processing device 54 subsequently increments the current pocket number P by one (1) at step S37 and proceeds to step S38 to determine whether the newly set pocket number P exceeds the maximum value Max of the number of pockets per sheet ("10" according to one or more embodiments).

In the case of negative determination, the control processing device 54 goes back to step S33 to perform the above series of processing again. In the case of affirmative determination, on the other hand, the control processing device 54 considers that spectral correction data of the tablets 5 in all the pocket portions 2 have been obtained and proceeds to step S39.

At step S39, the control processing device 54 performs a determination process. In this process, the control processing device 54 first performs an analysis process with regard to each tablet 5. This process corresponds to the analysis process according to one or more embodiments. The function of the control processing device 54 that performs this process configures the analysis module according to one or more embodiments.

For example, the analysis process of one or more embodiments uses a loading vector obtained in advance and performs principal component analysis (PCA) with regard to the spectral correction data of the tablet 5 obtained at step S35 described above. More specifically, the control processing device 54 calculates a principal component point by arithmetic operation of the loading vector and the spectral correction data of the tablet 5.

The control processing device 54 subsequently determines whether each of the tablets 5 is a non-defective product (identical type of object) or a defective product (different type of object). More specifically, the control processing device 54 plots the principal component point described above in a PCA chart and determines the tablet 5 as a non-defective product (identical type of object) when the plotted data is within a non-defective range set based on the deviation R described above or the like, while determining the tablet 5 as a defective product (different type of object) when the plotted data is out of the non-defective range.

The series of processing described above is performed for each of all the tablets 5 on the PTP sheet 1. When there is no tablet 5 determined as "defective", the control processing device 54 determines the PTP sheet 1 as a non-defective product and terminates the inspection routine. When there is any tablet 5 determined as "defective", on the other hand, the control processing device 54 determines the PTP sheet 1 as a defective product and terminates the inspection routine. The results of such inspection are output to the display device 73 and to the PTP packaging machine 10 (including the defective sheet discharge mechanism).

As described above in detail, the configuration of one or more embodiments enables the good/poor quality judgment to be performed with regard to the spectral data obtained by imaging the tablets 5 with substantially eliminating the influence of ambient light in different type inclusion inspection by taking advantage of spectral analysis.

As a result, this configuration allows for stable spectral analysis with regard to the tablets 5 even in the state that the tablets 5 are placed in the pocket portions 2 of the container film 3, and thereby suppresses reduction in inspection accuracy.

More specifically, the configuration of one or more embodiments specifies disturbance data (spectral data attributed to ambient light), based on the spectral data obtained by actually taking images of the non-defective tablets 5 placed in the pocket portions 2.

This configuration suppresses redundant information beyond necessity, for example, spectral data attributed to ambient light which the tablet 5 is actually not irradiated with, from being included in disturbance data and thereby enhances the inspection accuracy.

The present invention is not limited to the description of the above embodiments but may be implemented, for example, by configurations described below. The present invention may also be naturally implemented by applications and modifications other than those illustrated below.

(a) The embodiments described above illustrates the case where the content is the tablet 5. The type, the shape and the like of the content are, however, not specifically limited. The content may be, for example, a capsule, a supplement, or a food item. The tablet includes a solid preparation such as an uncoated tablet and a sugar-coated tablet.

(b) The materials of the container film 3 and the cover film 4 are not limited to those of the embodiments described above, but other materials may be employed. For example, the container film 3 may be made from a metal material that contains aluminum as a main material, for example, aluminum laminated film.

When the container film 3 is made from a light shielding material (opaque material) like this modification, the tablets 5 are irradiated, imaged and inspected from an opening side of the pocket portions 2 in a previous process before the cover film 4 is mounted to the container film 3 as described later.

When the container film 3 is made from the light shielding material, light reflected from the inner surface of the pocket portion 2 is likely to become ambient light and exert influence on the inspection.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) The above embodiments are configured to perform the different type inclusion inspection by the inspection device 45 across the pocket portions (container film 3) of the PTP sheet 1 conveyed by the conveyor 39 in a post process after the PTP sheet 1 is punched out from the PTP film 6.

This configuration is, however, not restrictive. A modification may be configured to perform the different type inclusion inspection by the inspection device 45 across the pocket portions (container film 3) of the PTP film 6 in a post process after the cover film 4 is mounted to the container film 3 and a previous process before the PTP sheet 1 is punched out from the PTP film 6.

Like the configuration of the embodiments described above, the configuration of such modification enables inspection to be performed in the state that the tablets 5 are not exchanged and thereby enhances the inspection accuracy.

(e) Another modification may be configured to perform the different type inclusion inspection by the inspection device 45 in a post process after the pocket portions 2 are filled with the tablets 5 and a previous process before the cover film 4 is mounted to the container film 3.

When the container film 3 is made from a transparent material, one possible configuration may perform irradiation, imaging and inspection of the tablets 5 across the pocket portions 2 (container film 3). Another possible configuration may perform irradiation, imaging and inspection of the tablets 5 from the opening side of the pocket portions 2.

The configuration of performing inspection from the opening side of the pocket portions 2 enables the tablets 5 to be irradiated and imaged not across the pocket portions 2 (container film 3) but directly without any shieling substance and accordingly enhances the inspection accuracy of the individual tablets 5. This configuration, on the other hand, has a possibility that the tablets 5 are exchanged and is thus likely to increase a non-defective error ratio and a defective error ratio as a whole.

When the container film 3 is made from a transparent material, light reflected from a disturbance factor different from the cover film 4, for example, a conveyance mechanism, located in the background is likely to become ambient light and exert influence on the inspection in a previous process before the cover film 4 is mounted.

(f) According to the embodiments described above, the inspection device 45 is provided in the PTP packaging machine 10 (inline inspection). This configuration may be replaced by a modified configuration that the inspection device 45 may be provided as a device separate from the PTP packaging machine 10 to perform offline inspection of the PTP sheet 1. In this modification, the inspection device 45 may be provided with a conveyance unit configured to convey the PTP sheet 1.

The offline inspection may be performed in the state that the PTP sheet 1 is not continuously conveyed but is at stop. From the viewpoint of enhancing the productivity, however, it is preferable to perform the inline inspection, while the PTP sheet 1, the PTP film 6 or the container film 3 is conveyed continuously.

In the manufacturing field of the PTP sheet 1 or the like, there is a recent demand for increasing the speed of various inspections such as different type inclusion inspection, accompanied with an increase in the production rate. For example, an inspection performed on the PTP packaging machine 10 may be required to inspect 100 or more tablets 5 per second.

(g) The configurations of the illumination device 52 and the imaging device 53 are not limited to those described in the above embodiments. For example, a reflection type diffraction grating, a prism or the like may be employed as the spectral unit, in place of the two-dimensional spectroscope 62.

(h) The embodiments described above is configured to analyze the spectral data by principal component analysis (PCA). This technique is, however, not restrictive. Another known technique, such as PLS regression analysis may be employed to analyze the spectral data.

(i) The method of grasping the disturbance data (spectral data with regard to the tablets 5 attributed to ambient light or approximate spectral data that is approximate to the spectral data attributed to the ambient light) is not limited to that of the above embodiments, but another method may be employed.

The above embodiments are configured to specify the disturbance data, based on the spectral data obtained by actually taking images of the non-defective tablets 5 placed in the pocket portions 2.

This configuration is, however, not restrictive. For example, a modification may be configured to take an image of the PTP sheet 1 (or the PTP film 6 or the container film 3) with the pocket portions 2 that are not filled with the tablets 5 but are vacant, so as to obtain spectral data with regard to a disturbance factor such as the cover film 4 and grasp the obtained spectral data as disturbance data.

Another modification may be configured to take an image of the cover film 4 itself before the cover film 4 is mounted to the container film 3, so as to obtain spectral data with regard to the cover film 4 and grasp the obtained spectral data as disturbance data.

(j) The method of specifying the disturbance data based on the spectral data obtained by imaging the non-defective tablets 5 is not limited to that of the above embodiments, but another method may be employed.

The above embodiments are configured to determine the measurement reference table (the average spectral intensities B(i) in the respective wavelength bands) as the averages of spectral data with regard to a plurality of non-defective tablets 5 obtained in advance, specify this measurement reference table as the "first spectral data having little influence of ambient light", specify measurement data exceeding the measurement reference table as the "second spectral data having significant influence of ambient light", and specify the disturbance data from a difference between these first spectral data and second spectral data.

This configuration is, however, not restrictive. For example, a modification may be configured to extract, for example, measurement data of upper 50% out of measurement data exceeding the measurement reference table (the first spectral data) as the second spectral data.

Another modification may be configured to specify an average value of measurement data of lower 30% out of the spectral data with regard to the plurality of non-defective tablets 5 obtained in advance as the "first spectral data having little influence of ambient light", specify an average value of measurement data of upper 30% as the "second spectral data having significant influence of ambient light", and specify the disturbance data from a difference between these first spectral data and second spectral data.

(k) The details of the correction process (the correction process of step S35 and the pre-correction process of step S34) are not limited to those of the above embodiments.

For example, the above embodiments are configured to correct the spectral data obtained by imaging the tablets 5 to be inspected, based on the disturbance data grasped in advance. This configuration is, however, not restrictive. A modification may be configured to correct the non-defective range as a reference value (threshold value) used to perform the good/poor quality judgment of the spectral data with regard to the tablets 5 to be inspected, based on the disturbance data.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet, 10 . . . PTP packaging machine, 45 . . . inspection device, 52 . . . illumination device, 53 . . . imaging device, 54 . . . control processing device, 62 . . . two-dimensional spectroscope, 62*a* . . . slit, 63 . . . camera, 64 . . . light-receiving element, 65 . . . imaging element, 74 . . . image data storage device, 75 . . . calculation result storage device, 76 . . . set data storage device, $L_s$ . . . optical spectrum

The invention claimed is:

1. An inspection device that performs an inspection by spectral analysis in manufacture of a Press Through Package (PTP) sheet that comprises a container film including a pocket portion in which a content is placed and a cover film closing the pocket portion, the inspection device comprising:
   an illumination device that irradiates the PTP sheet with near-infrared light;
   a spectroscope that disperses reflected light from the PTP sheet irradiated with the near-infrared light;
   an imaging device that takes an image of an optical spectrum of the reflected light dispersed by the spectroscope and acquires spectroscopic image data; and
   a controller that:
      obtains spectral data of the PTP sheet based on the spectroscopic image data,
      executes a predetermined analysis process based on the spectral data of the PTP sheet,
      before the inspection is performed, grasps disturbance data that is one of either spectral data of a predetermined content placed in the pocket portion and attributed to ambient light, or approximate spectral data approximate to the spectral data of the predetermined content attributed to the ambient light, wherein the ambient light is generated when a predetermined disturbance factor is irradiated by the illumination device, and
      while the inspection is performed, based on the disturbance data, corrects either spectral data of the content as an inspection object obtained based on the spectroscopic image data acquired by the imaging device, or a reference value used for determining the spectral data of the content as the inspection object.

2. The inspection device according to claim 1, wherein to grasp the disturbance data, the controller further:
   obtains spectral data of a plurality of non-defective contents that are imaged while being placed in a plurality of pocket portions,
   based on the spectral data of the non-defective contents:
      specifies first spectral data that has no influence of the ambient light or that has little influence of the ambient light, and
      specifies second spectral data that has influence of the ambient light to some extent or that has significant influence of the ambient light, and
   specifies the disturbance data from a difference between the first spectral data and the second spectral data.

3. The inspection device according to claim 2, wherein to correct the spectral data, the controller:
   multiplies the disturbance data by a predetermined coefficient,
   subtracts a resulting multiplied value from the spectral data of the content as the inspection object,
   specifies, as a correction coefficient, a coefficient that minimizes a difference between a resulting subtracted value and the first spectral data, and
   corrects the spectral data of the content as the inspection object based on the correction coefficient and the disturbance data.

4. The inspection device according to claim 3, wherein the illumination device is positioned where the content can be irradiated via the pocket portion with the near-infrared light, and
   the imaging device is positioned where the imaging device can take the image of the optical spectrum of the reflected light from the content via the pocket portion.

5. A Press Through Package (PTP) packaging machine that manufactures a PTP sheet, the PTP packaging machine comprising:
   the inspection device according to claim 4;
   a pocket portion former that forms a pocket portion in a container film that is conveyed in a belt-like manner;

a filler that fills a content into the pocket portion;

a mounter that mounts a cover film onto the container film to close the pocket portion; and a separator that separates the PTP sheet from a belt-like body obtained by mounting the cover film to the container film.

6. A Press Through Package (PTP) packaging machine that manufactures a PTP sheet, the PTP packaging machine comprising:

the inspection device according to claim 3, a pocket portion former that forms a pocket portion in a container film that is conveyed in a belt-like manner;

a filler that fills a content into the pocket portion;

a mounter that mounts a cover film onto the container film to close the pocket portion; and a separator that separates the PTP sheet from a belt-like body obtained by mounting the cover film to the container film.

7. The inspection device according to claim 2, wherein the illumination device is positioned where the content can be irradiated via the pocket portion with the near-infrared light, and the imaging device is positioned where the imaging device can take the image of the optical spectrum of the reflected light from the content via the pocket portion.

8. A Press Through Package (PTP) packaging machine that manufactures a PTP sheet, the PTP packaging machine comprising:

the inspection device according to claim 7;

a pocket portion former that forms a pocket portion in a container film that is conveyed in a belt-like manner;

a filler that fills a content into the pocket portion;

a mounter that mounts a cover film onto the container film to close the pocket portion; and a separator that separates the PTP sheet from a belt-like body obtained by mounting the cover film to the container film.

9. A Press Through Package (PTP) packaging machine that manufactures a PTP sheet, the PTP packaging machine comprising:

the inspection device according to claim 2;

a pocket portion former that forms a pocket portion in a container film that is conveyed in a belt-like manner;

a filler that fills a content into the pocket portion;

a mounter that mounts a cover film onto the container film to close the pocket portion; and a separator that separates the PTP sheet from a belt-like body obtained by mounting the cover film to the container film.

10. The inspection device according to claim 1, wherein the illumination device is positioned where the content can be irradiated via the pocket portion with the near-infrared light, and the imaging device is positioned where the imaging device can take the image of the optical spectrum of the reflected light from the content via the pocket portion.

11. A Press Through Package (PTP) packaging machine that manufactures a PTP sheet, the PTP packaging machine comprising:

the inspection device according to claim 10, a pocket portion former that forms a pocket portion in a container film that is conveyed in a belt-like manner;

a filler that fills a content into the pocket portion;

a mounter that mounts a cover film onto the container film to close the pocket portion; and a separator that separates the PTP sheet from a belt-like body obtained by mounting the cover film to the container film.

12. A Press Through Package (PTP) packaging machine that manufactures a PTP sheet, the PTP packaging machine comprising:

the inspection device according to claim 1;

a pocket portion former that forms a pocket portion in a container film that is conveyed in a belt-like manner;

a filler that fills a content into the pocket portion;

a mounter that mounts a cover film onto the container film to close the pocket portion; and a separator that separates the PTP sheet from a belt-like body obtained by mounting the cover film to the container film.

13. An inspection method of performing an inspection by spectral analysis in manufacture of a Press Through Package (PTP) sheet that comprises a container film including a pocket portion in which a content is placed and a cover film closing the pocket portion, using an inspection device that comprises: an illumination device; a spectroscope; an imaging device; and a controller, the method comprising:

irradiating, by the illumination device, the PTP sheet with near-infrared light;

dispersing, by the spectroscope, reflected light that is reflected from the PTP sheet irradiated with the near-infrared light;

taking, by the imaging device, an image of an optical spectrum of the reflected light dispersed by the spectroscope, and acquiring spectroscopic image data;

obtaining, by the controller, spectral data of the PTP sheet based on the spectroscopic image data;

executing, by the controller, a predetermined analysis process based on the spectral data of the PTP sheet;

before the inspection is performed, grasping, by the controller, disturbance data that is one of either spectral data of a predetermined content placed in the pocket portion and attributed to ambient light, or approximate spectral data approximate to the spectral data of the predetermined content attributed to the ambient light, wherein the ambient light is generated when a predetermined disturbance factor is irradiated by the illumination device; and while the inspection is performed, based on the disturbance data, correcting, by the controller, either spectral data of the content as an inspection object obtained based on the spectroscopic image data acquired by the imaging device, or a reference value used for determination of the spectral data of the content as the inspection object.

* * * * *